US008655691B2

(12) United States Patent
van Os et al.

(10) Patent No.: US 8,655,691 B2
(45) Date of Patent: Feb. 18, 2014

(54) PROCESSING INVITATIONS AND ACCEPTING CONFIGURATION INFORMATION ON A DEVICE

(75) Inventors: Marcel MWA van Os, San Francisco, CA (US); Freddy A. Anzures, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 599 days.

(21) Appl. No.: 12/242,539

(22) Filed: Sep. 30, 2008

(65) Prior Publication Data

US 2009/0228322 A1 Sep. 10, 2009

Related U.S. Application Data

(60) Provisional application No. 61/033,672, filed on Mar. 4, 2008.

(51) Int. Cl.
*G06Q 10/00* (2012.01)

(52) U.S. Cl.
USPC .......................................................... 705/5

(58) Field of Classification Search
USPC .......................................................... 705/5
See application file for complete search history.

(56) References Cited

U.S. PATENT DOCUMENTS

| 6,369,840 | B1 | 4/2002 | Barnett et al. | |
|---|---|---|---|---|
| 7,487,458 | B2 | 2/2009 | Jalon et al. | |
| 2003/0122787 | A1* | 7/2003 | Zimmerman et al. | 345/173 |
| 2008/0046311 | A1* | 2/2008 | Shahine et al. | 705/14 |
| 2009/0100347 | A1* | 4/2009 | Schemers et al. | 715/751 |

OTHER PUBLICATIONS

Timecruiser Computer Corporation, "Timecruiser User Guide," version 1.5, Jul. 1998, downloaded on Aug. 3, 2005 at https://www.atd.timecruiser/doc.

* cited by examiner

*Primary Examiner* — Allen J Jung
(74) *Attorney, Agent, or Firm* — Blakely, Sokoloff, Taylor & Zafman LLP

(57) ABSTRACT

Systems, methods, and computer program products display invites on a mobile device calendar. An invitation is received that identifies an event having a start time and a duration. The invitation is presented to a user of a mobile device, where the mobile device includes two or more calendars. The invitation is associated with at least one of the two or more calendars, and the event is displayed in at least one calendar associated with the invitation.

21 Claims, 25 Drawing Sheets

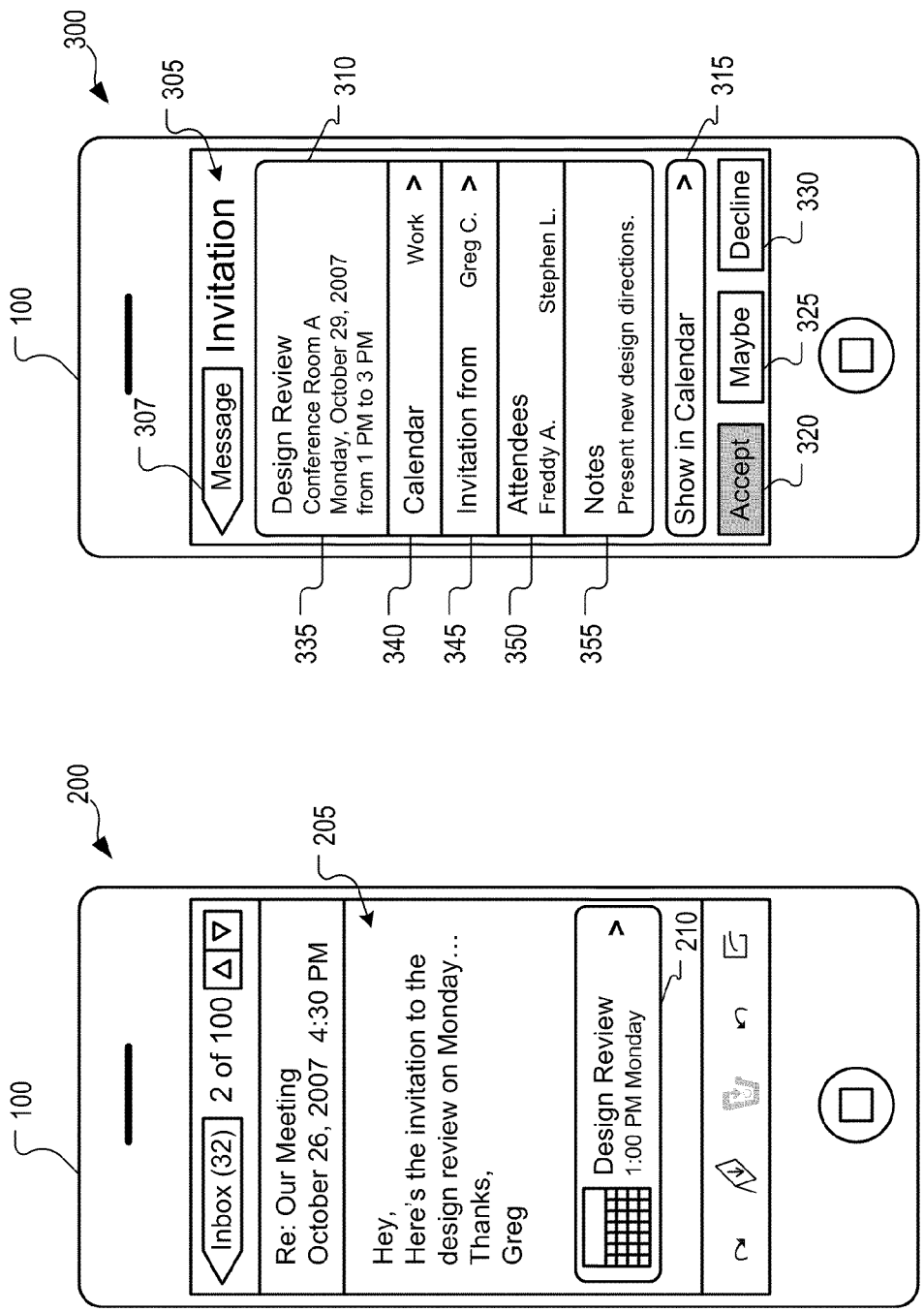

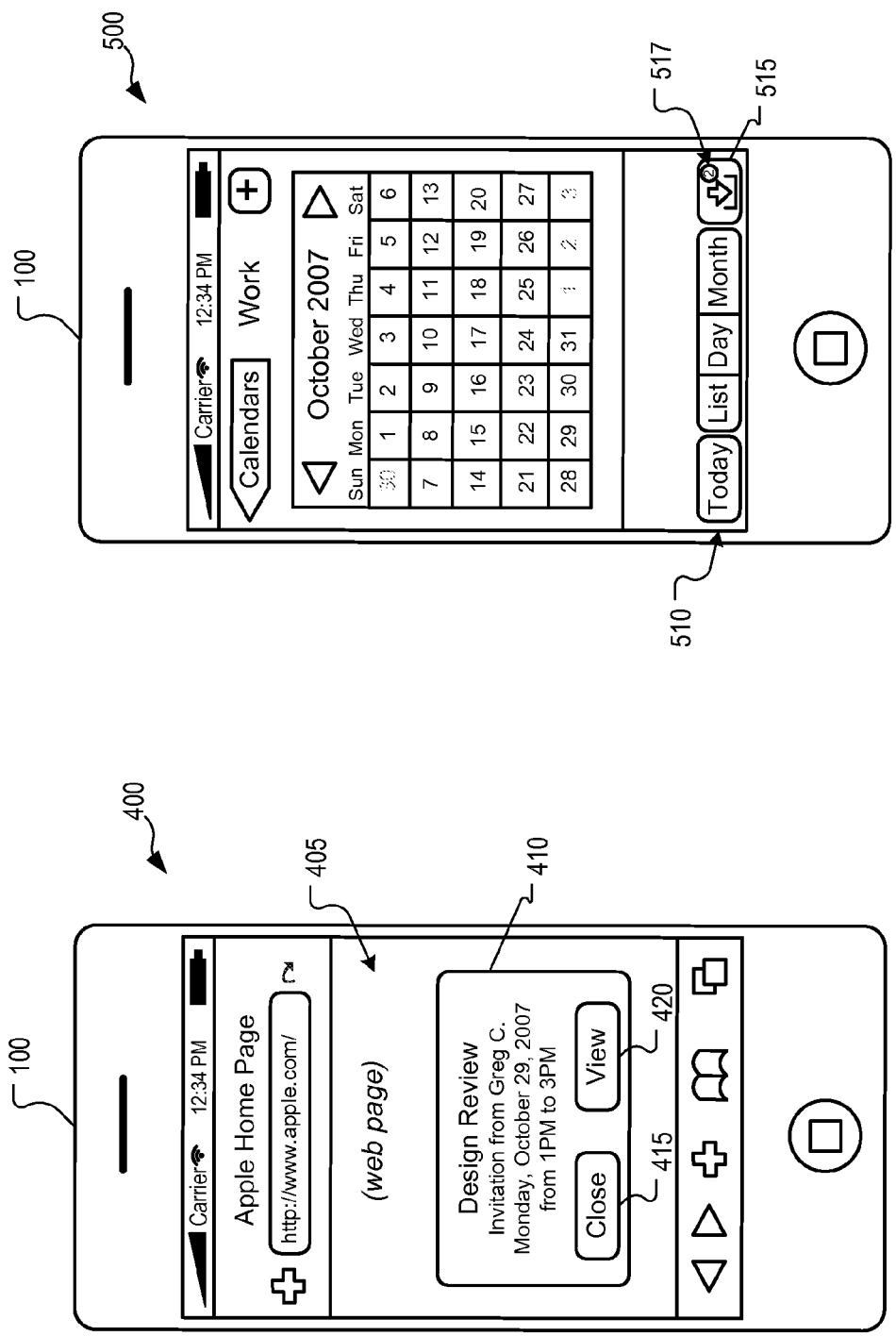

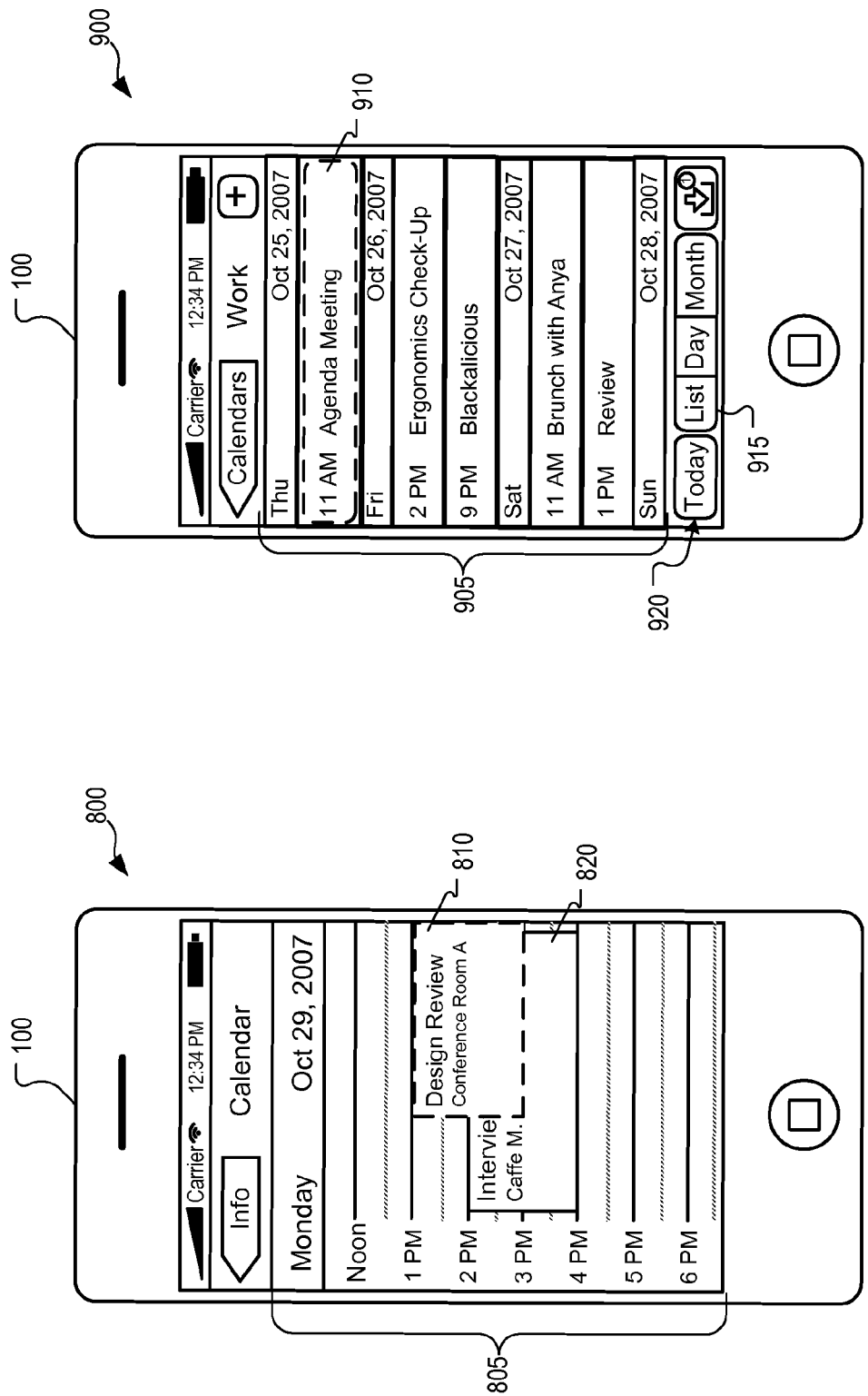

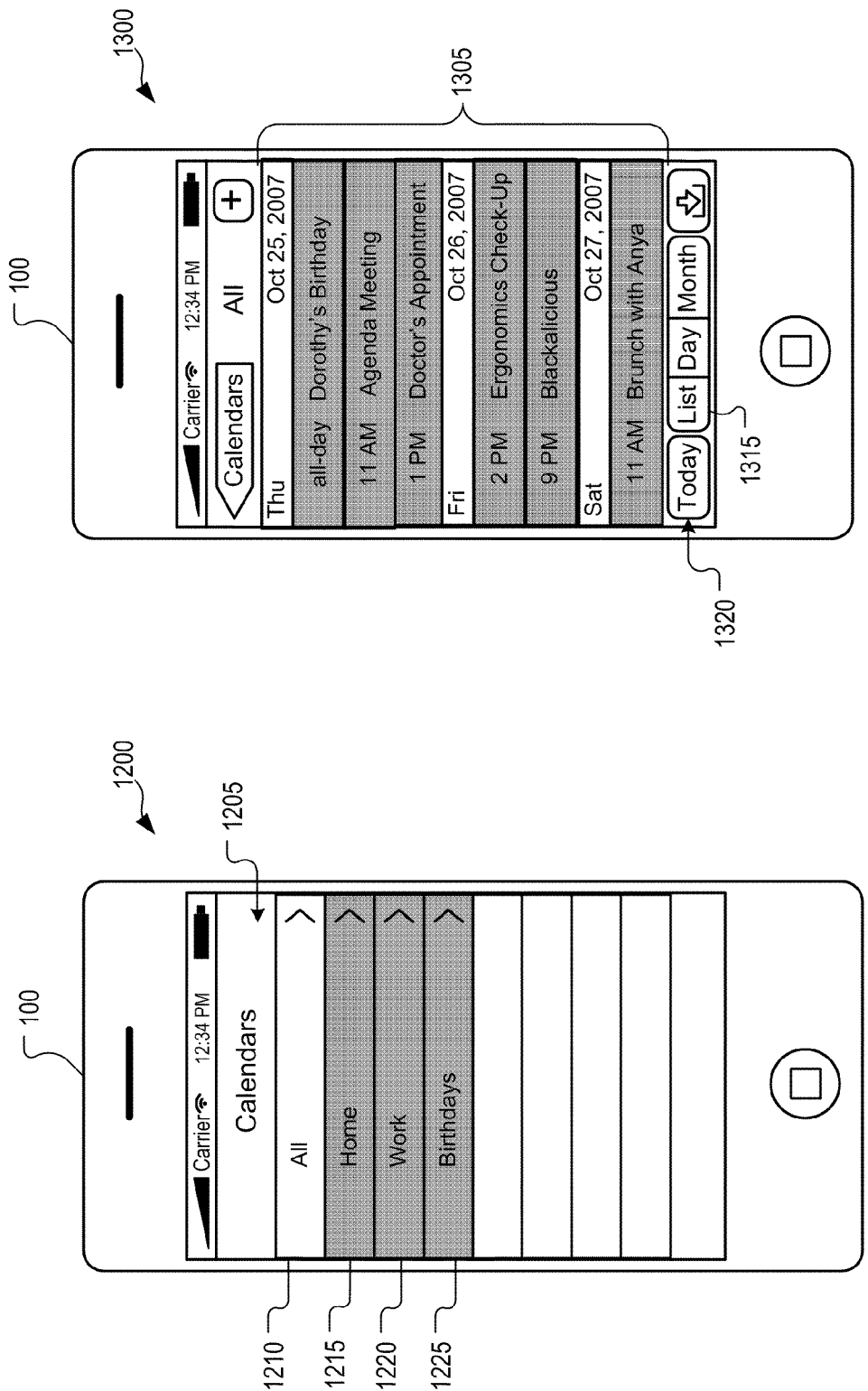

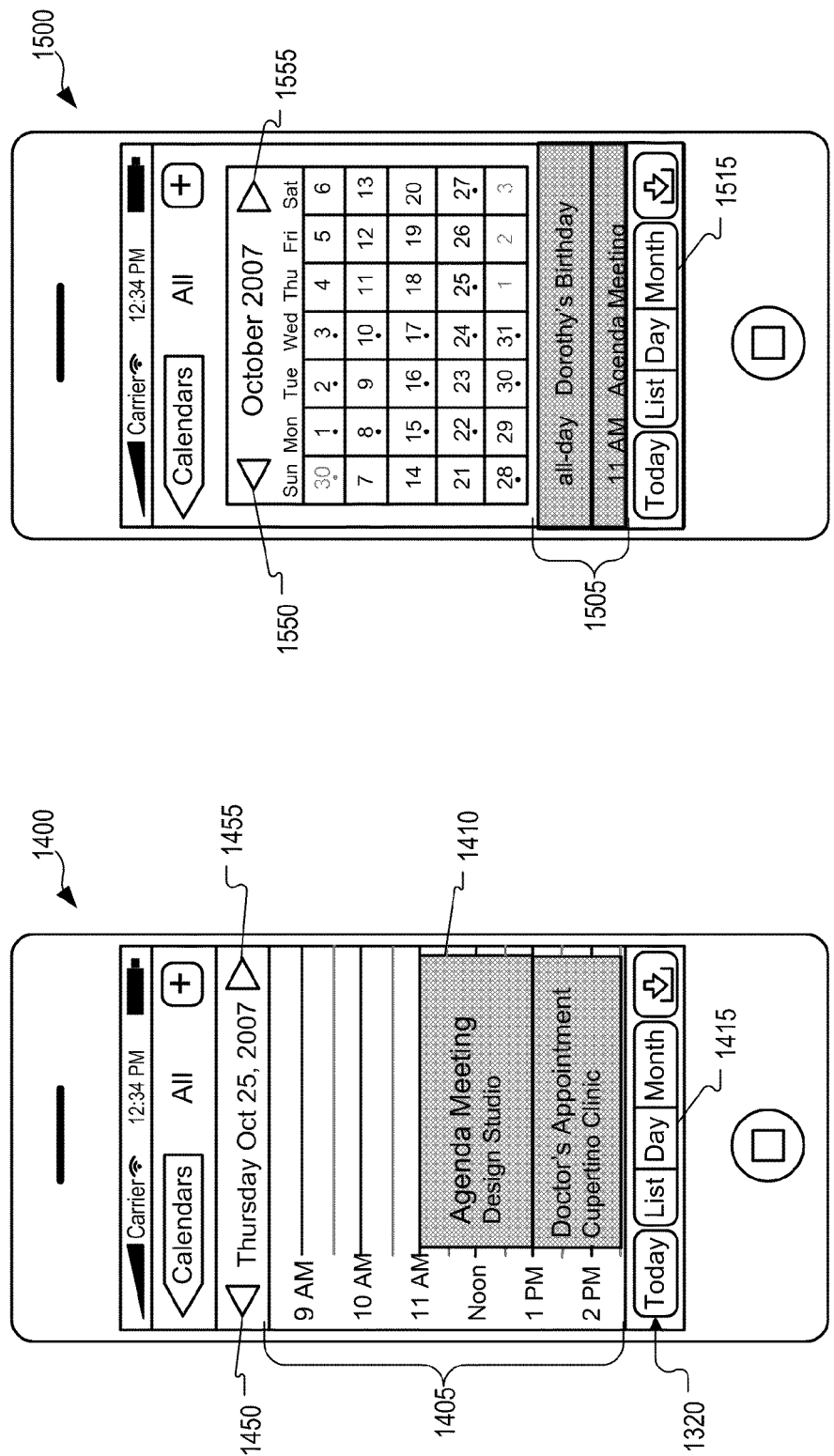

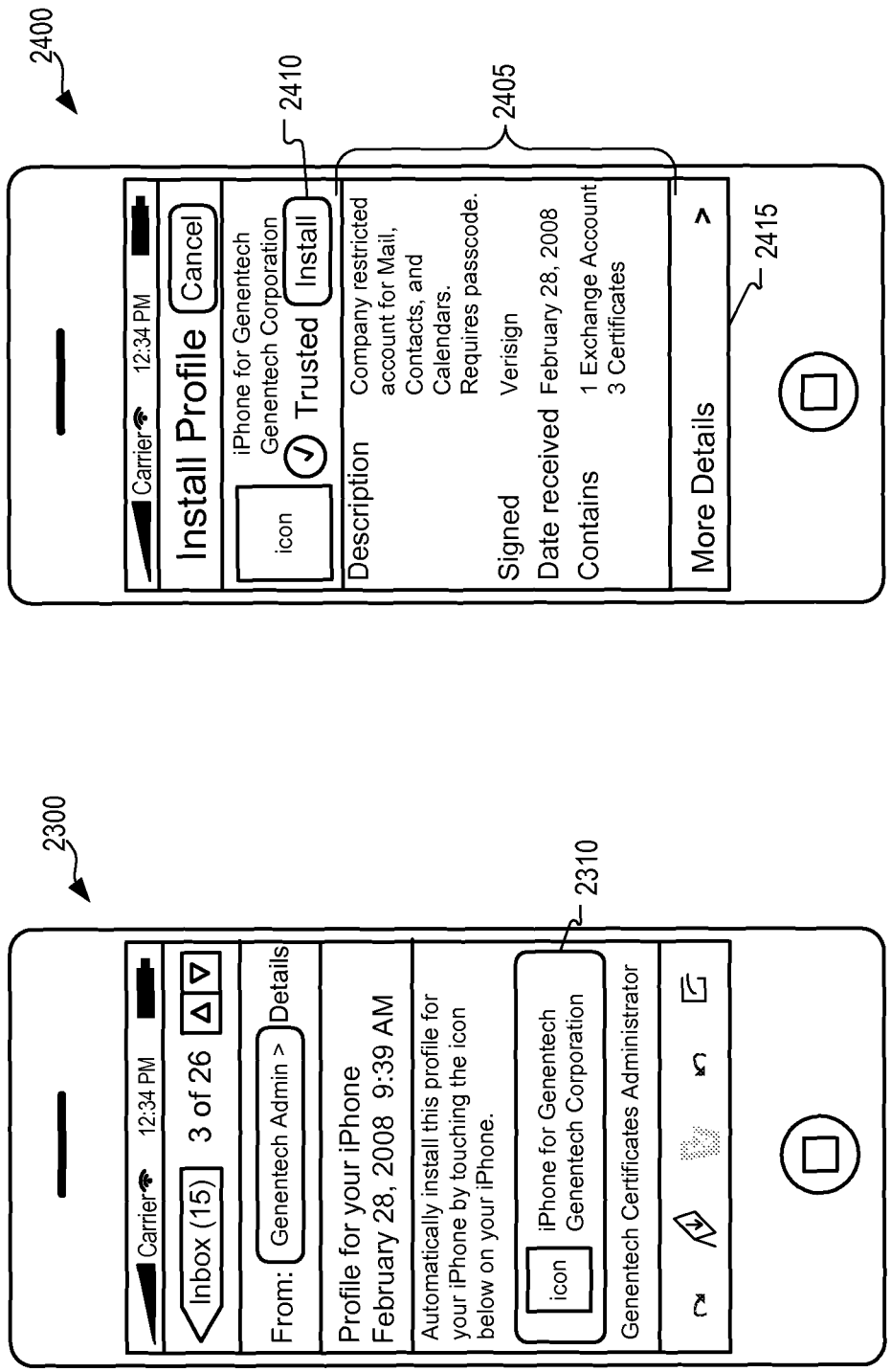

PROCESSING INVITATIONS AND ACCEPTING CONFIGURATION INFORMATION ON A DEVICE

RELATED APPLICATION DATA

This application claims priority to U.S. Provisional Patent Application Ser. No. 61/033,672, filed Mar. 4, 2008, titled "Processing Invitations and Accepting Configuration Information on a Device", the disclosure of which is incorporated herein by reference in its entirety as if set forth fully herein.

FIELD OF THE INVENTION

The present disclosure relates to processing invitations and accepting configuration information on electronic devices, such as mobile devices.

BACKGROUND

Electronic devices, such as mobile devices, can include electronic calendars that synchronize with electronic calendars on desktop computers. For instance, acceptance of a meeting request on a desktop computer can result in meeting times being uploaded to the mobile device. The calendars in such devices are limited, however, to displaying calendar events, such as meetings, birthday parties, etc., on the same calendar and in the same manner. For instance, conventional devices include a single calendar for illustrating both work-related and personal events.

Electronic devices, such as mobile devices, also enable the creation of personalized themes and the installation of applications. One problem with existing devices is that devices are not easily customizable so that users can install one or more profiles, including profiles received from remote sources. Another problem with existing devices is that the user cannot easily view and/or approve trust certificates and the like for applications the user wishes to install.

SUMMARY

In general, one aspect of the subject matter described in this specification can be embodied in methods, systems and computer program products.

One method includes the actions of receiving an invitation, the invitation identifying an event having a start time and a duration, presenting the invitation to a user of a mobile device, the mobile device including two or more calendars, associating the invitation with at least one of the two or more calendars, and displaying the event in the at least one calendar associated with the invitation.

According to one feature, the method also includes receiving an instruction from the user, the instruction identifying the at least one calendar associated with the invitation. The at least one calendar can include two or more calendars. According to another feature, the method can include requesting that the invitation be accepted or declined by the user. Additionally, displaying the event can include displaying the event as an impermanent event in the at least one calendar until the user accepts the invitation. According to yet another feature, the method can include displaying the invitation to the user while the user is interacting with an application of the mobile device.

Another method includes the actions of receiving a first invitation, the first invitation identifying a first event, receiving a second invitation, the second invitation identifying a second event, associating the first invitation with a first calendar, associating the second invitation with a second calendar, and displaying a composite calendar, the composite calendar including the first event and the second event.

According to one feature, displaying the composite calendar includes displaying each of the first event and second events as respective event blocks in the composite calendar. Each of the respective event blocks is associated with a different color, and/or may be shaded or colored a different color. According to another feature, the composite calendar can include a daily calendar, a weekly calendar, or a monthly calendar.

Yet another method includes the actions of receiving a plurality of invitations, each of the plurality of invitations associated with an invitation object, displaying each of the invitation objects to a user, and storing each of the invitation objects in an invite list. The method also includes receiving a user request to process at least one of the invitation objects, adding an event identified by an invitation associated with the at least one of the invitation objects to one of a plurality of calendars, and displaying the event in the one of the plurality of calendars.

According to one feature, the method can also include receiving an instruction from the user, the instruction identifying the one of the plurality of calendars. According to another feature, the method can include requesting that each of the plurality of invitations be accepted or declined by the user. Additionally, displaying the event can include displaying the event as an impermanent event until the user accepts the invitation. Moreover, the plurality of invitations can be received at a mobile device, and the method can also include displaying the invitation to the user while the user is interacting with an application of the mobile device.

Another method includes the actions of receiving, at a mobile device, at least two trust certificates, installing the at least two trust certificates on the mobile device, displaying at least two trust certificate objects in a graphical user interface, where each trust certificate object corresponds to a respective received trust certificate, and upon receiving a user selection of one of the trust certificate objects, enabling the trust certificate corresponding to the user selected trust certificate object.

Still another method includes the actions of receiving a first profile at a mobile device, the first profile represented by a first profile object, receiving a second profile at the mobile device, the second profile represented by a second profile object, and displaying the first profile object and the second profile object in a graphical user interface. The method also includes receiving a user selection of either the first profile object or the second profile object, and enabling the profile represented by the user selected profile object.

According to a feature, displaying the first profile object and the second profile object in a graphical user interface includes displaying the first profile object and the second profile object in a profiles list. According to another feature, the method includes displaying details of the profile represented by the user selected profile object. According to yet another feature, receiving the first profile at the mobile device includes receiving the first profile at the mobile device as an email attachment. Receiving the second profile at the mobile device can also include receiving the second profile at the mobile device via a web page.

Yet another method includes the actions of receiving a first profile at a mobile device, the first profile represented by a first profile object, and receiving a second profile at the mobile device, the second profile represented by a second profile object. The method also includes displaying the first profile object and the second profile object in a graphical user interface, receiving a user selection of either the first profile object and the second profile object, and deleting the profile represented by the user selected profile object after receiving a user instruction to delete the profile represented by the user selected profile object.

Some of the following advantages are achieved. Users can receive invitations through email or while using other applications of the mobile device, such as during web browsing. Invitations can be stored in a single location for later processing by a user. For instance, all pending invitations can be stored and viewed in a list in a single GUI. Additionally, invitations can be added to one or more calendars. Events defined by the invitations can be viewed in the separate calendars. Alternatively, a consolidated calendar showing all invitations may be displayed. The events displayed in the consolidated calendar can be color coordinated so that a user can quickly determine if the events are associated with a particular calendar (e.g., a work calendar, home calendar, birthday calendar, or the like).

Users can also use the mobile device 100 to download trust certificates from email and web sites. Users can select a trust certificate from a list of stored trust certificates via a single GUI. Additionally, the mobile device permits the storage and management of multiple profiles, which may be password protected.

The details of one or more implementations of the subject matter described in this specification are set forth in the accompanying drawings and the description below. Other features, aspects, and advantages of the subject matter will become apparent from the description, the drawings, and the claims.

DESCRIPTION OF DRAWINGS

FIG. 2 illustrates an example inbox message Graphical User Interface (GUI).
FIG. 3 illustrates an example invitation GUI.
FIG. 4 illustrates an example invitation notification GUI.
FIG. 5 illustrates an example monthly calendar view GUI.
FIG. 8 illustrates an example show in calendar GUI.
FIG. 9 illustrates an example calendar GUI in list mode.
FIG. 12 illustrates an example calendars GUI.
FIG. 13 illustrates a consolidated calendar GUI in list mode.
FIG. 14 illustrates a consolidated calendar GUI in day mode.
FIG. 15 illustrates a consolidated calendar GUI in month mode.
FIG. 23 illustrates an example email message GUI.
FIG. 24 illustrates an example install profile GUI.

DETAILED DESCRIPTION

Example Mobile Device

Figure 1:
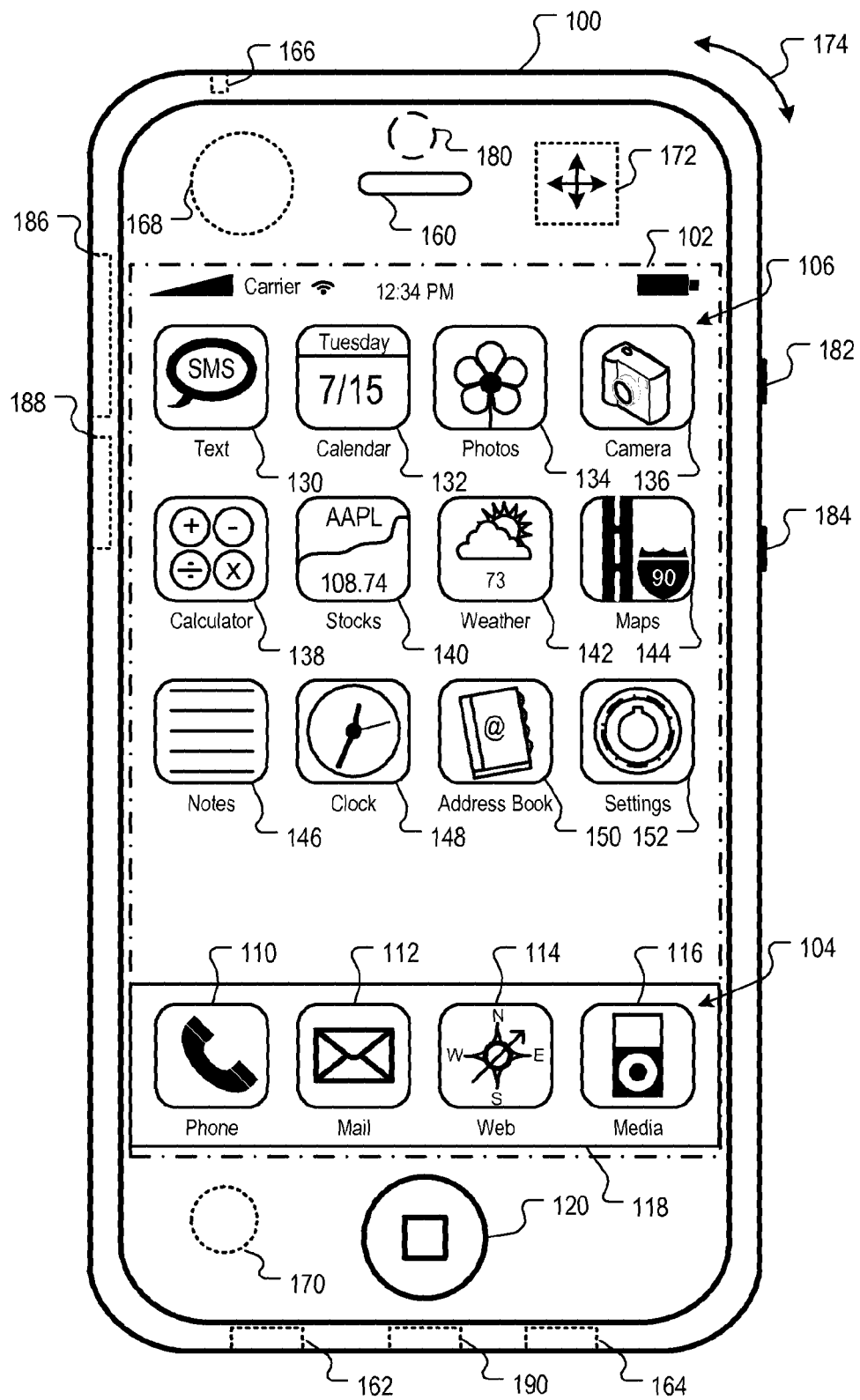
FIG. 1 is a block diagram of an example mobile device.

FIG. 1 is a block diagram of an example mobile device 100. The mobile device 100 can be, for example, a handheld computer, a personal digital assistant, a cellular telephone, a network appliance, a camera, a smart phone, an enhanced general packet radio service (EGPRS) mobile phone, a network base station, a media player, a navigation device, an email device, a game console, or a combination of any two or more of these data processing devices or other data processing devices.

Mobile Device Overview

In some implementations, the mobile device 100 includes a touch-sensitive display 102. The touch-sensitive display 102 can implement liquid crystal display (LCD) technology, light emitting polymer display (LPD) technology, or some other display technology. The touch-sensitive display 102 can be sensitive to haptic and/or tactile contact with a user.

In some implementations, the touch-sensitive display 102 can comprise a multi-touch-sensitive display 102. A multi-touch-sensitive display 102 can, for example, process multiple simultaneous touch points, including processing data related to the pressure, degree, and/or position of each touch point. Such processing facilitates gestures and interactions with multiple fingers, chording, and other interactions. Other touch-sensitive display technologies can also be used, e.g., a display in which contact is made using a stylus or other pointing device. Some examples of multi-touch-sensitive display technology are described in U.S. Pat. Nos. 6,323,846, 6,570,557, 6,677,932, and 6,888,536, each of which is incorporated by reference herein in its entirety.

In some implementations, the mobile device 100 can display one or more graphical user interfaces (GUIs) on the touch-sensitive display 102 for providing the user access to various system objects and for conveying information to the user. In some implementations, the graphical user interface (GUI) can include one or more display objects 104, 106. In the example shown, the display objects 104, 106, are graphic representations of system objects. Some examples of system objects include device functions, applications, windows, files, alerts, events, or other identifiable system objects.

Example Mobile Device Functionality

In some implementations, the mobile device 100 can implement multiple device functionalities, such as a telephony device, as indicated by a phone object 110; an e-mail device, as indicated by the e-mail object 112; a network data communication device, as indicated by the Web object 114; a Wi-Fi base station device (not shown); and a media processing device, as indicated by the media player object 116. In some implementations, particular display objects 104, e.g., the phone object 110, the e-mail object 112, the Web object 114, and the media player object 116, can be displayed in a menu bar 118. In some implementations, device functionalities can be accessed from a top-level GUI, such as the GUI illustrated in FIG. 1. Touching one of the objects 110, 112, 114, or 116 can, for example, invoke corresponding functionality.

In some implementations, the mobile device 100 can implement network distribution functionality. For example, the functionality can enable the user to take the mobile device 100 and provide access to its associated network while traveling. In particular, the mobile device 100 can extend Internet access (e.g., Wi-Fi) to other wireless devices in the vicinity. For example, mobile device 100 can be configured as a base station for one or more devices. As such, mobile device 100 can grant or deny network access to other wireless devices.

In some implementations, upon invocation of device functionality, the GUI of the mobile device 100 changes, or is augmented or replaced with another user interface or user interface elements, to facilitate user access to particular functions associated with the corresponding device functionality. For example, in response to a user touching the phone object 110, the GUI of the touch-sensitive display 102 may present display objects related to various phone functions; likewise, touching of the email object 112 may cause the GUI to present display objects related to various e-mail functions; touching the Web object 114 may cause the GUI to present display objects related to various Web-surfing functions; and touching the media player object 116 may cause the GUI to present display objects related to various media processing functions.

In some implementations, the top-level GUI environment or state of FIG. 1 can be restored by pressing a button 120 located near the bottom of the mobile device 100. In some implementations, each corresponding device functionality may have corresponding "home" display objects displayed on the touch-sensitive display 102, and the GUI environment of FIG. 1 can be restored by pressing the "home" display object.

In some implementations, the top-level GUI can include additional display objects 106, such as a short messaging service (SMS) object 130, a calendar object 132, a photos object 134, a camera object 136, a calculator object 138, a stocks object 140, a weather object 142, a maps object 144, a notes object 146, a clock object 148, an address book object 150, and a settings object 152. Touching the SMS display object 130 can, for example, invoke an SMS messaging environment and supporting functionality; likewise, each selection of a display object 132, 134, 136, 138, 140, 142, 144, 146, 148, 150, and 152 can invoke a corresponding object environment and functionality.

Additional and/or different display objects can also be displayed in the GUI of FIG. 1. For example, if the device 100 is functioning as a base station for other devices, one or more "connection" objects may appear in the GUI to indicate the connection. In some implementations, the display objects 106 can be configured by a user, e.g., a user may specify which display objects 106 are displayed, and/or may download additional applications or other software that provides other functionalities and corresponding display objects.

In some implementations, the mobile device 100 can include one or more input/output (I/O) devices and/or sensor devices. For example, a speaker 160 and a microphone 162 can be included to facilitate voice-enabled functionalities, such as phone and voice mail functions. In some implementations, an up/down button 184 for volume control of the speaker 160 and the microphone 162 can be included. The mobile device 100 can also include an on/off button 182 for a ring indicator of incoming phone calls. In some implementations, a loud speaker 164 can be included to facilitate hands-free voice functionalities, such as speaker phone functions. An audio jack 166 can also be included for use of headphones and/or a microphone.

In some implementations, a proximity sensor 168 can be included to facilitate the detection of the user positioning the mobile device 100 proximate to the user's ear and, in response, to disengage the touch-sensitive display 102 to prevent accidental function invocations. In some implementations, the touch-sensitive display 102 can be turned off to conserve additional power when the mobile device 100 is proximate to the user's ear.

Other sensors can also be used. For example, in some implementations, an ambient light sensor 170 can be utilized to facilitate adjusting the brightness of the touch-sensitive display 102. In some implementations, an accelerometer 172 can be utilized to detect movement of the mobile device 100, as indicated by the directional arrow 174. Accordingly, display objects and/or media can be presented according to a detected orientation, e.g., portrait or landscape. In some implementations, the mobile device 100 may include circuitry and sensors for supporting a location determining capability, such as that provided by the global positioning system (GPS) or other positioning systems (e.g., systems using Wi-Fi access points, television signals, cellular grids, Uniform Resource Locators (URLs)). In some implementations, a positioning system (e.g., a GPS receiver) can be integrated into the mobile device 100 or provided as a separate device that can be coupled to the mobile device 100 through an interface (e.g., port device 190) to provide access to location-based services.

In some implementations, a port device 190, e.g., a Universal Serial Bus (USB) port, or a docking port, or some other wired port connection, can be included. The port device 190 can, for example, be utilized to establish a wired connection to other computing devices, such as other communication devices 100, network access devices, a personal computer, a printer, a display screen, or other processing devices capable of receiving and/or transmitting data. In some implementations, the port device 190 allows the mobile device 100 to synchronize with a host device using one or more protocols, such as, for example, the TCP/IP, HTTP, UDP and any other known protocol. In some implementations, a TCP/IP over USB protocol can be used, as described in U.S. Provisional Patent Application No. 60/945,904, filed Jun. 22, 2007, for "Multiplexed Data Stream Protocol," which provisional patent application is incorporated by reference herein in its entirety.

The mobile device 100 can also include a camera lens and sensor 180. In some implementations, the camera lens and sensor 180 can be located on the back surface of the mobile device 100. The camera can capture still images and/or video.

The mobile device 100 can also include one or more wireless communication subsystems, such as an 802.11b/g communication device 186, and/or a Bluetooth™ communication device 188. Other communication protocols can also be supported, including other 802.x communication protocols (e.g., WiMax, Wi-Fi, 3G), code division multiple access (CDMA), global system for mobile communications (GSM), Enhanced Data GSM Environment (EDGE), etc.

Invitations and Calendar GUIs

FIG. 2 illustrates an example inbox message GUI 200 of the mobile device 100. The inbox message GUI 200 may be accessed, for instance, by user selection of the e-mail object 112 shown in FIG. 1. The inbox message GUI 200 includes an e-mail message 205 titled "RE: Our Meeting" that includes an invitation object 210. According to some implementations, the invitation object 210 is an event notification, such as a meeting invite or other scheduled event that may be added to the device 100 user's schedule. Therefore, the invitation represents an event having a start time and a duration.

The invitation object 210 can be a user-selectable display object within the e-mail message 205. According to some implementations, one or more graphics can be included in the invitation, such as an arrow (e.g., '>'), to indicate to a user of the mobile device 100 that the invitation is selectable by the user. In the example interface, the invitation object 210 represents an invite to a design review meeting taking place at 1:00 PM on Monday.

FIG. 3 illustrates an example invitation GUI 300 of the mobile device 100. The invitation GUI 300 is presented to a user after an invitation object is selected. For instance, after the invitation object 210 shown in FIG. 2 is selected the invitation GUI 300 is displayed, which shows the invitation 310 represented by the invitation object 210. A top bar 305 informs the user that the user is no longer viewing the e-mail message 205, but the invitation 310. To return to the e-mail message 205 shown in FIG. 2 the user can select the message object 307.

The invitation 310 includes several fields 335, 340, 345, 350, 355 displaying details of the invitation, some of which are configurable by a user of the device 100. These details can include, for instance, the time, location, and duration of an event, a list of attendees (if any), the identity of the person who sent the invitation, and notes that may offer additional information about the invitation. For instance, the example invitation 310 of FIG. 3 displays that the design review meeting is to be held in conference room A on Monday, Oct. 29, 2007, from 1 to 3 PM, that the invitation originated from Greg C., and that the attendees include Freddy A, and Stephen L.

According to some implementations, a user can identify one or more calendars that an invitation will be associated with via a calendar field 340. Because the device 100 can include multiple separate calendars (e.g., separate calendars for work or home events), a user can identify which calendar or calendars an invitation should be associated with such that it is stored and viewed in that calendar (or calendars). This allows a user to maintain separate calendars each having corresponding invitations. According to some implementations, selection of the calendar field 340 permits a user a toggle selection of one or more calendars that the user may identify as associated with the invitation. As described in greater detail below, the mobile device 100 permits a user to view all events created by invitations simultaneously in a consolidated calendar view, regardless of the specific calendar each event is associated with.

In some implementations, one or more of the fields 335, 340, 345, 350, 355 that display details of the invitation 310 can be separately scrollable to enable the user to view additional information without requiring expansion of the fields on the interface 300 or through selection and display of the fields on a separate interface.

Figure 7:
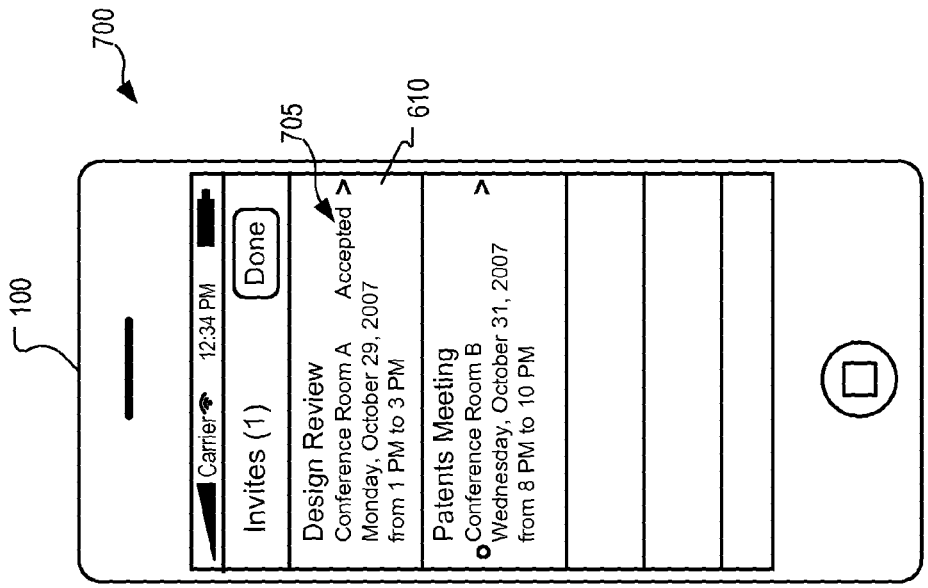
FIG. 7 illustrates another example invitation review GUI.

The invitation GUI 300 also includes a user-selectable show in calendar display object 315 that permits a user to view the invitation 310 in a calendar, as is described with respect to FIG. 7. As is also shown in FIG. 3, when the invitation 310 is displayed in the invitation GUI 300 a user is presented with one of three user-selectable display objects: an accept object 320, a maybe object 325, and a decline object 330. The accept object 320 permits the user to accept the invitation, which will place the event in the calendar of the device 100 identified by the user by calendar field 340 and may transmit an automated accept response to the e-mail address of the person who transmitted the invitation (and possibly to all attendees). The decline object 330 permits the user to decline the invitation, which may result in the transmission of an automated decline response to the e-mail address of the person who transmitted the invitation (and possibly to one or more attendees). Selection of the maybe object 325 permits the user to defer accepting or declining the invitation and places the invitation in an invitation review GUI described with respect to FIG. 6.

FIG. 4 illustrates an example invitation notification GUI 400 of the mobile device 100. The invitation notification GUI 400 illustrates a pop-up invitation object 410 that can appear in a window when the user is using an application of the mobile device 100, such as a web viewing application that displays a web screen 405. In some implementations the pop-up invitation object 410 can appear as an opaque, transparent, and/or shaded overlay appearing above an application of the mobile device 100. Because the pop-up invitation object 410 can appear while the user is using any application of the mobile device 100, the user can be immediately notified of a new invitation. This can occur, for instance, if the invitation is not received via email and/or if the user is not currently viewing an e-mail application of the device 100. Although not illustrated, the user may configure whether or not the user wishes to be informed of (i.e., view) invitation objects during use of applications, such as viewing the 'design review' pop-up invitation object 410 during use of a web page viewing application as in the illustrative invitation notification GUI 400 of FIG. 4.

The pop-up invitation object 410 is similar to the invitation object 210 shown in FIG. 2. The object 410 can include a title of the invention (in FIG. 4, 'design review'), the sender or originator of the invitation, and the time and date of the invitation. The pop-up invitation object 410 can be closed by the user by selection of a close object 415 so that the user can continue viewing and/or using the application the user was interacting with before the object 410 appeared. Alternatively, the user can select a view object 420. If the user selects the view object 420 the user will be able to view details of the invitation in an invitation GUI such as the invitation GUI 300 shown in FIG. 3.

FIG. 5 illustrates an example monthly calendar view GUI 500 of the mobile device 100. The monthly calendar GUI 500 includes a lower bar 510 that includes an invitation link object 515. The invitation link object 515 can also include a number 517 that indicates the number of invitations to be processed by the user, i.e., those invitations that the user hasn't either accepted or rejected. According to some implementations, the number 517 indicates the number of invitations to be processed, which are those invitations for which a user has selected the maybe object 325. Selecting the invitation link object 515 causes the device 100 to display an invitation review GUI such as the example invitation review GUI 600 of FIG. 6.

Figure 6:
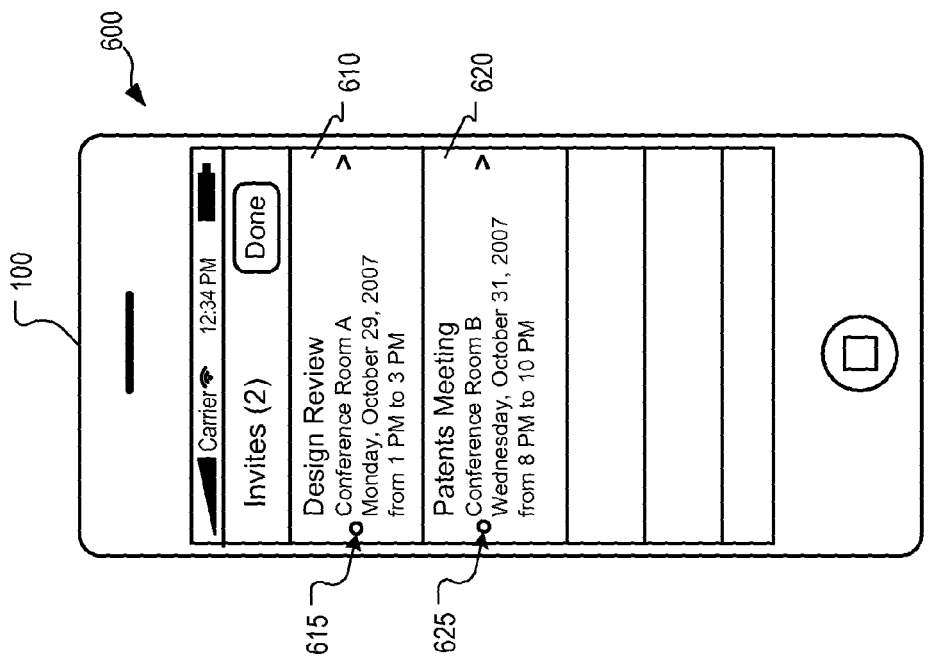
FIG. 6 illustrates an example invitation review GUI.

The example invitation review GUI 600 shown in FIG. 6 displays a list of invitations that the user has not yet accepted or rejected. In some implementations, the invitation review GUI 600 displays a list of invitations for which the user selected the maybe object 325. For instance, if a user receives an invitation and fails to accept or reject it, and/or selects the maybe object 325 in the invitation GUI 300, the invite will be displayed in the invitation review GUI 600. This GUI 600 provides a user with a single screen to view all invitations the user has yet to accept or reject. Two invitation objects 610, 620 are displayed in the example review GUI 600 of FIG. 6.

In some implementations, each invitation object in the GUI 600 can include a selection bullet 615, 625 when the user has yet to accept or reject each invitation. Additionally, each invitation can include one or more graphics, such as an arrow (e.g., '>'), to indicate to a user of the mobile device 100 that the invitation object is selectable by the user. By selecting an invitation object from the invitation review GUI 600 the user will be presented with the details of the invitation in the invitation GUI 300.

FIG. 7 illustrates another example invitation review GUI 700 displayed after a user reviews and accepts an invitation represented by an invitation object 610, for instance, by selecting the accept object 320 in the invitation GUI 300. The invitation object is displayed, as shown in FIG. 7, as accepted. The device may remove the invitation object from the invitation review GUI 700 next time the GUI 700 is displayed to the user, and/or after a period of time elapses.

FIG. 8 illustrates an example show in calendar GUI 800 displayed to the user upon selection of the show in calendar object 315 in the invitation GUI 300. The show in calendar GUI 800 displays an event associated with an invitation, such as the event identified in the example invitation 310 of FIG. 3, in a calendar display. In particular, the event is displayed with its title and location (identified by the invitation) in block form, where the block extends from the start time of the event identified by the invitation to an end time of the event identified by the invitation. For instance, the example 'design review' event is shown by event block 810 as beginning at 1 pm and ending at 3 pm. In some implementations the event block may appear as an overlay in front of any existing scheduled events stored by the device 100, such as event block 820 shown in FIG. 8.

The display of an event corresponding to an invitation in the show in calendar GUI 800 allows a user to quickly determine whether the event identified by the invitation conflicts with other events the user has scheduled and stored in the device's 100 calendar. This may help assist a user in deciding whether or not to accept or reject an invitation.

The example show in calendar GUI 800 shown in FIG. 8 illustrates a calendar window 805 of any events occurring from approximately noon to 6:30 p.m., which is a partial day view of the calendar. According to some implementations, the device 100 is can display a partial day, full day, multiple day, partial month, or multiple month view in the show in calendar GUI 800, as is necessary to show the duration of the invitation the user seeks to view in calendar form. For instance, if an invitation covers an event spanning 5 days, such as a personal vacation, the show in calendar GUI 800 can show the event in a week view so that any conflicting events can be viewed by the user. According to some implementations, the calendar window 805 is scrollable so that a user can advance the calendar to view other events that occur on the same or different days as the event identified by an invitation.

Figures 10, 11:
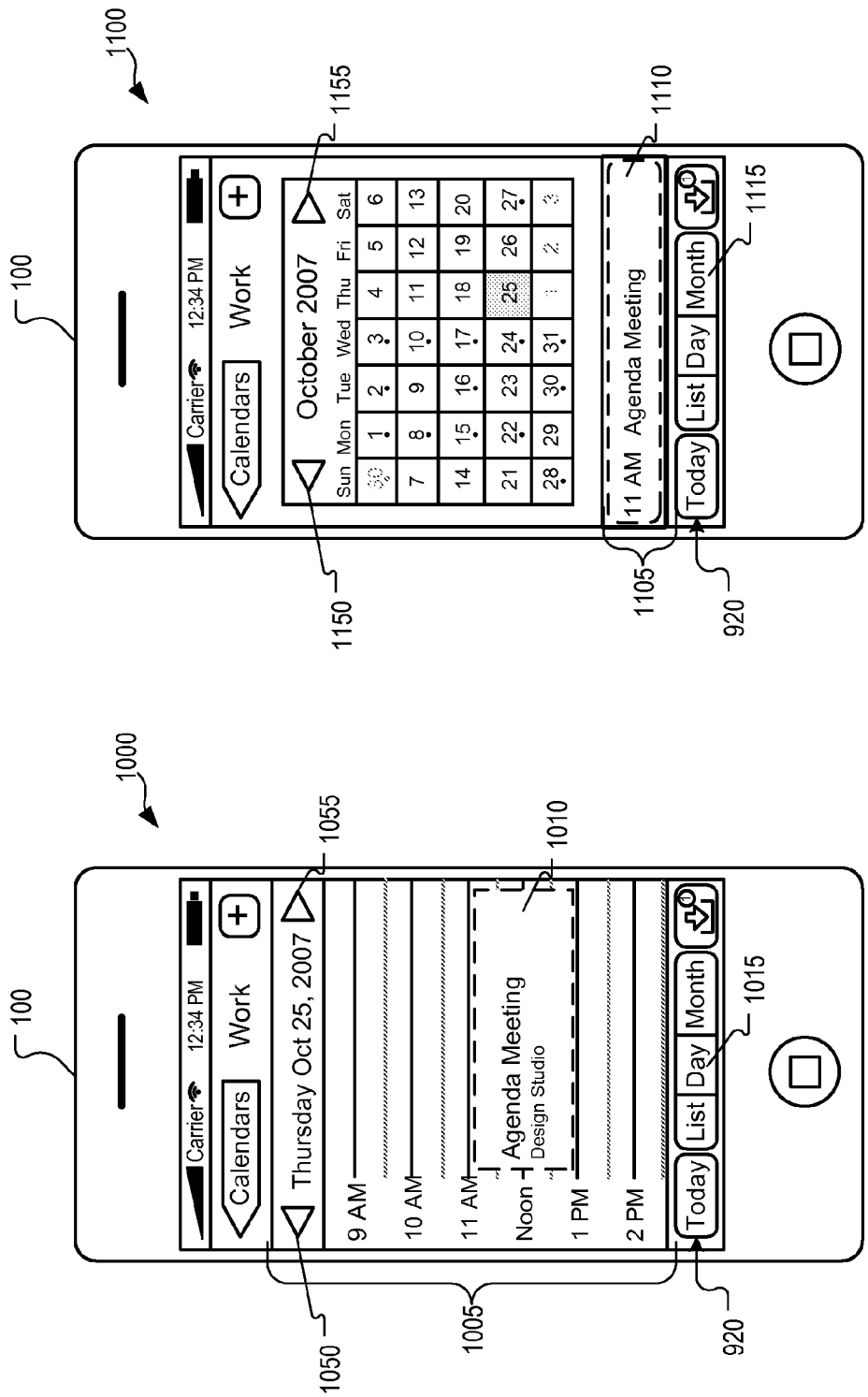
FIG. 10 illustrates an example calendar GUI in day mode.
FIG. 11 illustrates an example calendar GUI in month view.

As described above, a user can independently view one of several calendars stored in the device 100. For instance, a user can view events created by invitations that are identified by the user to be work-related. FIGS. 9, 10, and 11, respectively show example work calendar GUIs 900, 1000, 1100 showing event blocks 910, 1010, 1110 illustrating the time at which a work event is scheduled that corresponds to an invitation. In each of the GUIs 900, 1000, 1100 the event blocks 910, 1010, 1110 are illustrated in outline form because the corresponding invitation has not been accepted or rejected by the user. Therefore, the device 100 permits a user to preview an event in a calendar before accepting or rejecting an invitation for that event. According to some implementations, the event blocks 910, 1010, 1110 are illustrated in opaque, transparent, or shaded form to represent to the user that they have not yet been accepted or rejected by the user.

FIG. 9 illustrates a calendar GUI 900 in list mode, which is selected by a user selection of a list object 915 in a lower bar 920. List mode presents a window 905 that is scrollable by a user (e.g., by touch) to show past and later periods of time. The window 905 illustrates, in list form, all events associated with invitations that have been accepted or that the user has identified with the maybe object 325. In the example GUI 900 shown in FIG. 9, the 11 AM Agenda Meeting is shown with a dashed line to indicate that the use has not yet accepted or rejected the invitation for that event.

FIG. 10 illustrates a calendar GUI 1000 in day mode, which is selected by a user selection of a day object 1015 in the lower bar 920. The day mode also presents a window 1005 that is scrollable by a user (e.g., by touch) to show past and later periods of time within a day. The window 1005 illustrates by default events within a period of time for the current day. Events are displayed in event blocks, such as event block 1010, to graphically represent the start time and duration of an event identified by an invitation. A user can view other days by selecting (e.g., by pressing) a previous day object 1050 or a next day object 1055. In the example GUI 1000 shown in FIG. 10, the 11 AM Agenda Meeting is shown as an event block 1010 with a dashed line to indicate that the use has not yet accepted or rejected the invitation for that event.

FIG. 11 illustrates a calendar GUI 1100 in month mode, which is selected by a user selection of a month object 1115 in the lower bar 920. The month mode allows the selection of a particular day by a user, for instance, by touching the desired day. The selected day may be highlighted or shaded. In the example of FIG. 11, the 25$^{th}$ of October is selected. The month mode includes an event window 1105 that show events occurring within the selected day. The event window 1105 is scrollable by a user (e.g., by touch) past and later periods of time within the selected day. In the example GUI 1100 shown in FIG. 11, the 11 AM Agenda Meeting is shown as an event block 1110 with a dashed line to indicate that the use has not yet accepted or rejected the invitation for that event. Additionally, a user can view other months by selecting (e.g., by pressing) a previous month object 1150 or a next month object 1155.

Consolidated Event Calendar

As previously described, a user can identify a particular calendar that an invitation will be associated with via a calendar object 340. Because the device 100 can include multiple separate calendars (e.g., separate calendars for work or home events), a user can identify one or more calendars an invitation should be associated with such that the event identified by that invitation is stored and viewed in the correct calendar. This allows a user to maintain separate calendars each having corresponding invitations.

FIG. 12 illustrates an example calendars GUI 1200. The calendars GUI 1200 includes a screen 1205 that permits a user to select an individual calendar for viewing, such as home, work, and birthday calendars. For instance, a user selection of a work object 1220 permits the user to view one or more of the work calendar GUIs 900, 1000, 1100 described above with respect to FIGS. 9, 10, and 11. Similarly, a user can select a home object 1215 or a birthdays object 1225 to view, respectively, home calendar GUIs or birthday calendar GUIs that display events established by invitations the user has identified for display in home or birthday calendars.

In addition to selecting a single calendar for viewing, the calendars GUI 900 permits a user to view all events simultaneously in a consolidated calendar view by selection of an all events object 120. As shown by the shading in FIG. 12, in some implementations each calendar may be associated with a particular background color. When events corresponding to multiple calendars are viewed simultaneously the background color may be used as a key so that events can be identified by the user as associated with a particular calendar. This is illustrated in FIGS. 13, 14, and 15.

FIG. 13 illustrates a consolidated calendar GUI 1300 in list mode, which is selected by a user selection of a list object 1315 in a lower bar 1320. List mode presents a window 1305 that is scrollable by a user (e.g., by touch) to show past and later periods of time. The window 1305 shows, in list form, all events associated with invitations that have been accepted or that the user has identified with the maybe object 325. Each event is colored (or shaded) to indicate the calendar that event is associated with. For instance, the 'Agenda Meeting' is colored to show that it is stored in the work calendar, 'Dorothy's Birthday' is colored to show that it is stored in the birthday calendar, and 'Doctor's Appointment' is colored to show that it is stored in the home calendar.

FIG. 14 illustrates a consolidated calendar GUI 1400 in day mode, which is selected by a user selection of a day object 1415 in the lower bar 1320. The day mode also presents a window 1405 that is scrollable by a user (e.g., by touch) to show past and later periods of time within a day. The window 1405 shows by default events within a period of time for the current day. Events are displayed in event blocks, such as event block 1410, to graphically represent the start time and duration of an event identified by an invitation. As with the consolidated calendar GUI 1300 in list mode, each event is colored (or shaded) to indicate the calendar that event is associated with. For instance, the 'Agenda Meeting' event is colored to show that it is stored in the work calendar, and the 'Doctor's Appointment' event is colored to show that it is stored in the home calendar. A user can view other days by selecting (e.g., by pressing) a previous day object 1450 or a next day object 1455.

FIG. 15 illustrates a consolidated calendar GUI 1500 in month mode, which is selected by a user selection of a month object 1515 in the lower bar 1320. The month mode allows the selection of a particular day by a user, for instance, by touching the desired day. The selected day may be highlighted or shaded. According to some implementations, a graphical object, such as a dot, may indicate those days in the monthly calendar that include events.

In the example of FIG. 15, the 25$^{th}$ of October is selected. The month mode includes an event window 1505 that show events occurring within the selected day. The event window 1505 is scrollable by a user (e.g., by touch) past and later periods of time within the selected day. As with the consolidated calendar GUIs 1300, 1400 in list and day mode, each event is colored (or shaded) to indicate the calendar that event is associated with. For instance, 'Dorothy's Birthday' is colored to show that it is stored in the birthday calendar, and the 'Agenda Meeting' event is colored to show that it is stored in the work calendar. Additionally, a user can view other months by selecting (e.g., by pressing) a previous month object 1550 or a next month object 1555.

Figure 16:
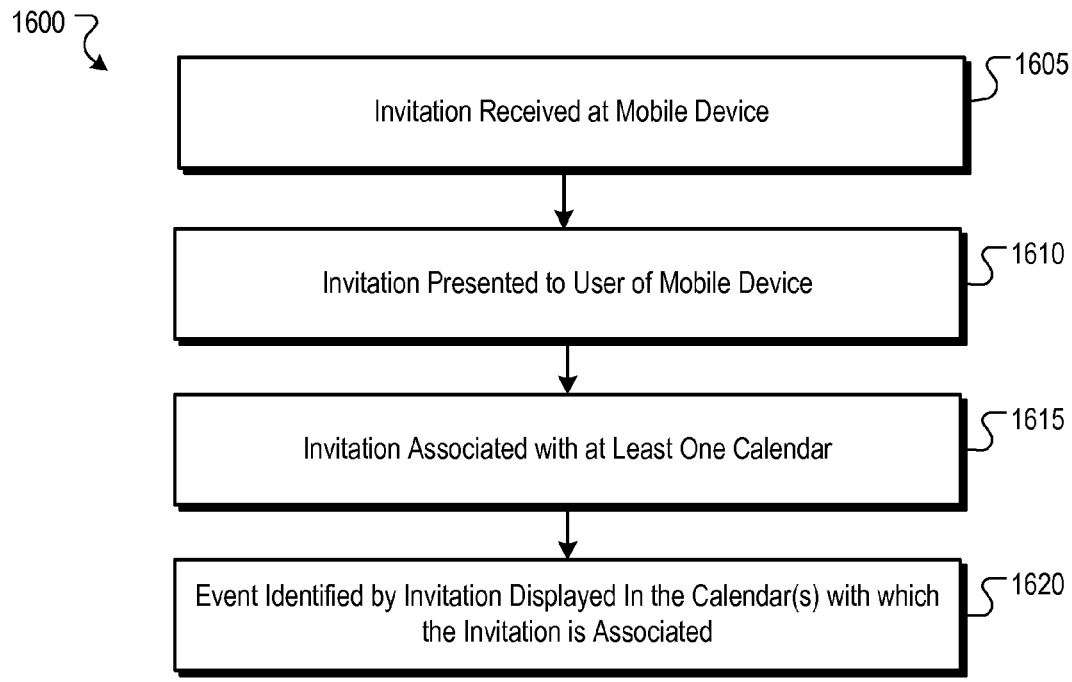
FIG. 16 illustrates an example process for displaying an event in at least one calendar.

FIG. 16 illustrates an example process 1600 for displaying an event in at least one calendar. An invitation is received at the mobile device 1605, where the invitation identifies an event having a start time and a duration. According to some implementations, the invitation may be received via e-mail or via another application operating on the mobile device 100.

The invitation is presented to a user of the mobile device 1610. According to some implementations, the invitation is presented (i.e., displayed) to the user while the user is interacting with an application of the mobile device, such as a web application or an e-mail application. The invitation may be presented first as an invitation object that the user selects to view the full details of the invitation.

The invitation is associated with at least one of two or more calendars stored by the mobile device 1615. In some implementations a user can identify one or more calendars that are associated with the invitation. This can occur, for instance, by the user selecting one or more calendars in an invitation GUI. For instance, a list of calendars may be presented to a user, which can toggle the calendars on or off to identify one or more calendars associated with an invitation.

Next, the event identified by the invitation is displayed in the one or more calendars associated with the invitation 1620. In some implementations, the event is displayed as an impermanent one, such as using an opaque, shaded, translucent, outlined, or translucent event block, until the invitation identifying the event is accepted by the user. Thereafter the event may be displayed in solid form, for instance, without an opaque or translucent event block.

Figure 17:
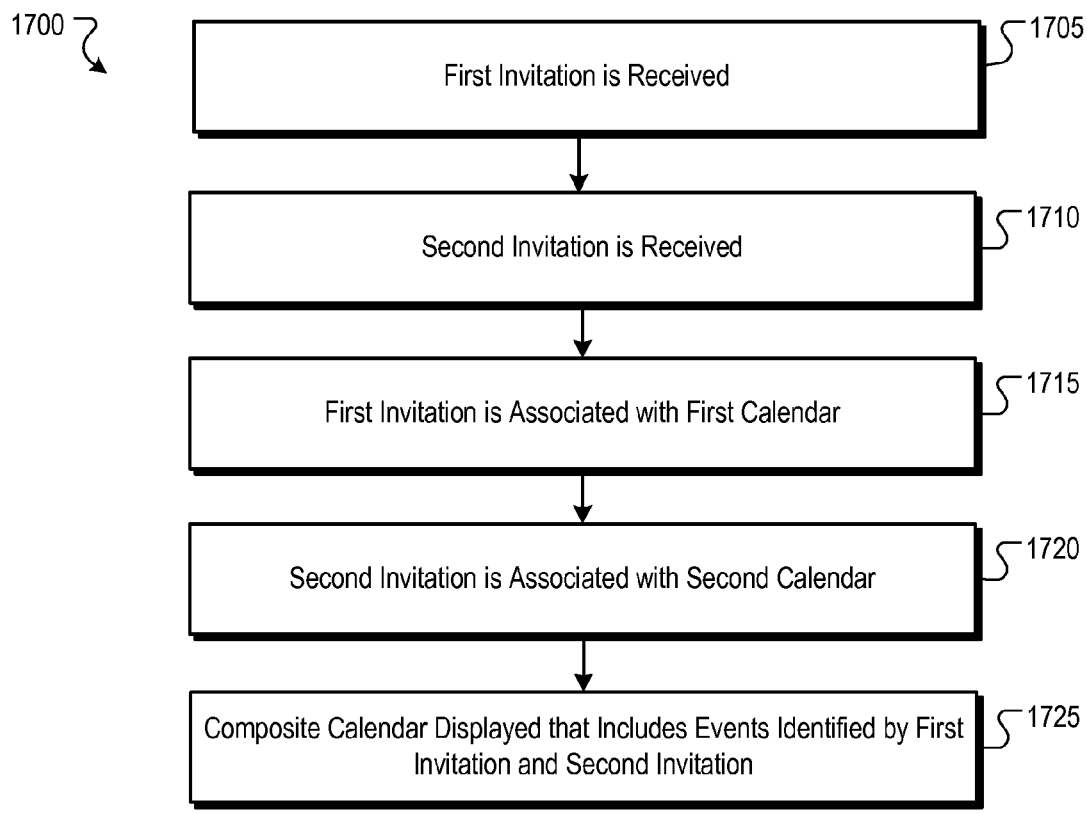
FIG. 17 illustrates an example process for displaying a composite calendar.

FIG. 17 illustrates an example process 1700 for displaying a composite calendar. A first invitation is received 1705, for instance, by the mobile device 100, where the first invitation identifies a first event. A second invitation is received 1710, for instance, by the mobile device, where the second invitation identifies a second event. According to some implementations, the invitations may be received via e-mail or via another application operating on the mobile device 100.

The first invitation 1715 is associated with a first calendar, and the second invitation 1720 is associated with a second calendar. According to some implementations a user can identify one or more calendars associated with each of the first and second invitations. This can occur, for instance, by the user selecting one or more calendars in an invitation GUI.

A composite calendar is displayed 1725, for instance, by the mobile device 100, where the composite calendar includes the first event and the second event. According to some implementations, the first and second events are displayed as respective event blocks in the composite calendar. Additionally, each of the respective event blocks can be associated with or shaded a different color. The use of different colors allows a user to quickly identify the calendar an event is associated with, which can assist the user in quickly determining what type of events are scheduled.

Figure 18:
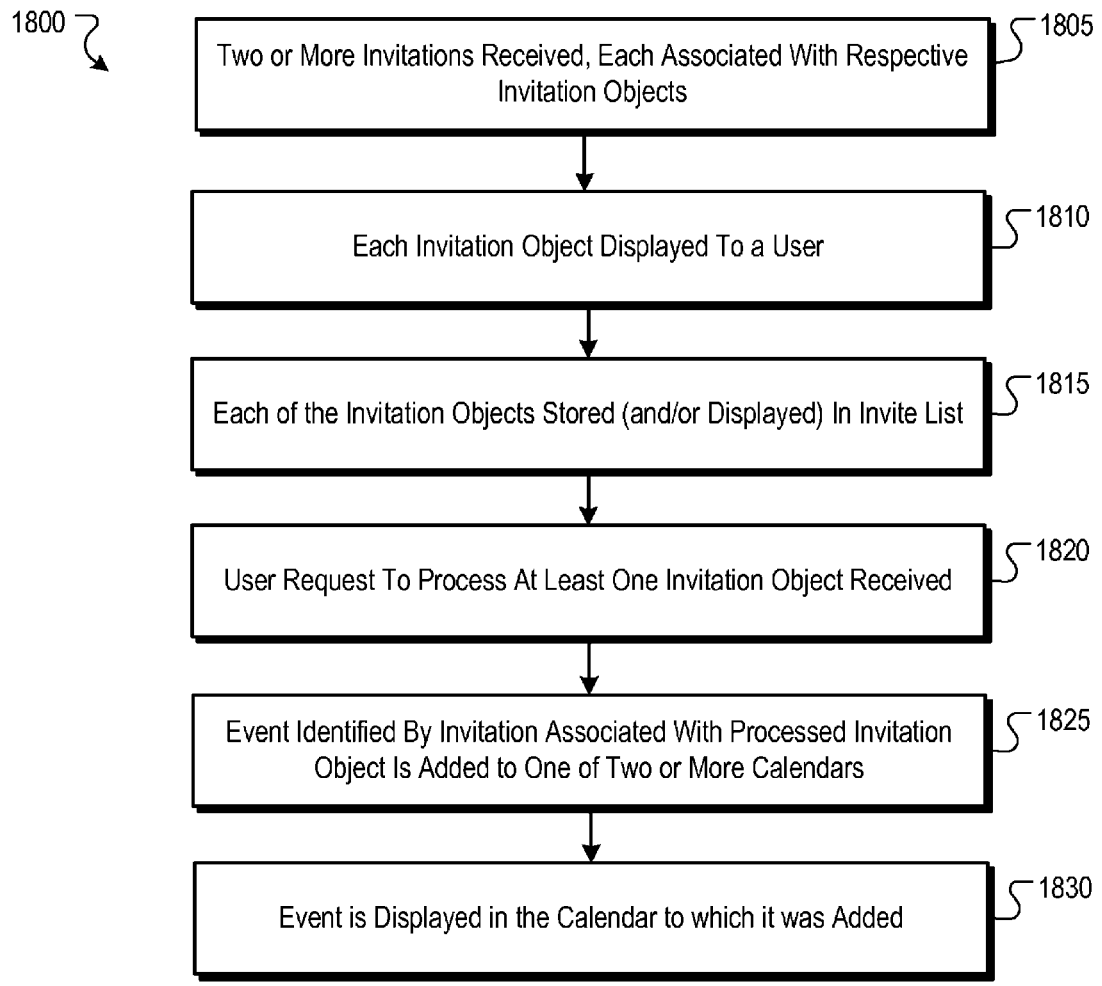
FIG. 18 illustrates an example process for displaying a list of invitation objects to a user.

FIG. 18 illustrates an example process 1800 for displaying a list of invitation objects to a user. A plurality of invitations are received 1805, where each of the plurality of invitations associated with an invitation object. For instance, the invitations can be received at the mobile device 100, and invitation objects may be user-selectable windows each identifying a particular invitation.

Each of the invitation objects are displayed to a user 1810, such as a user of the mobile device 100. According to some implementations, the invitation is presented (i.e., displayed) to the user while the user is interacting with an application of the mobile device. Next, each of the invitation objects are stored and/or displayed in an invite list 1815. According to some implementations, the invitation objects are displayed in an invitation review GUI, such as the invitation review GUI 600 shown in FIG. 6. A user request to process at least one of the invitation objects is received 1820. This can occur, for instance, when a user selects an invitation object from the invitation review GUI.

An event identified by an invitation associated with the at least one of the invitation objects is added to one of a plurality of calendars 1825. The event is displayed 1830 in the one of the plurality of calendars. In some implementations, the event is displayed as an impermanent one, such as using an opaque, outlined, or translucent event block, until the invitation identifying the event is accepted by the user.

Profile Management—Certificates and Profile Information

The mobile device 100 can be used to download trust certificates that can be installed in the mobile device 100. In some implementations the mobile device 100 can download trust certificates via e-mail and/or from web sites. The trust certificates can be configured, installed and viewed subsequent to being downloaded. Additionally, the mobile device 100 permits a user to store and manage multiple profiles, where each profile can be associated with one or more trust certificates. Certificates and profiles can also be received at the mobile device 100 by an update (user-initiated or automatic) of the profile itself. According to some implementations the mobile device 100 can prompt a user using an alert feature to request approval for an update or to identify that an update has or will occur.

Figure 19:
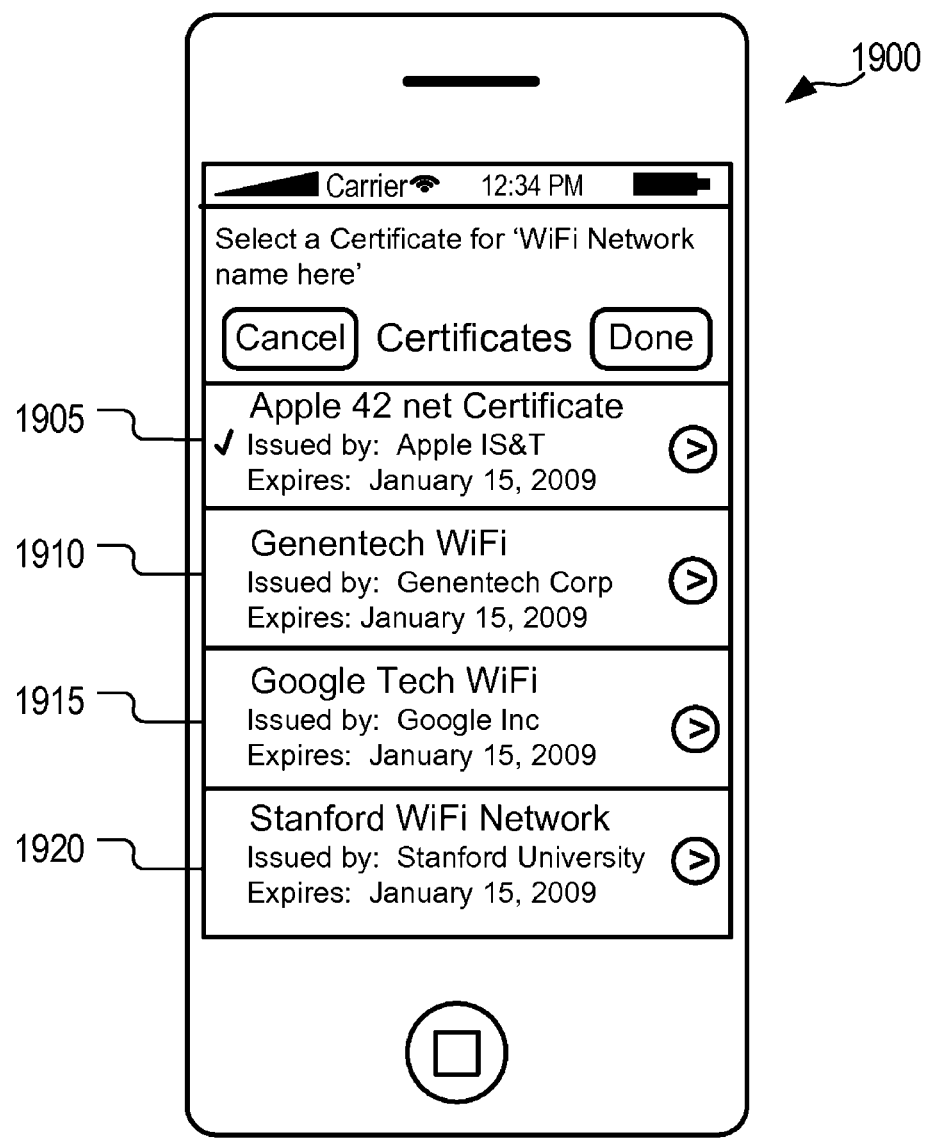
FIG. 19 illustrates an example certificate selection GUI.

FIG. 19 illustrates an example certificate selection GUI 1900. The GUI 1900 includes a list of certificates objects 1905, 1910, 1915, 1920 that can be selected by a user of the mobile device 100. According to some implementations, the GUI 1900 is populated with certificates previously downloaded and stored by the mobile device 100. For instance, the certificates can include certificates that may be used by the mobile device 100 to communicate with a WiFi Network. A user can select one of the certificate objects 1905, 1910, 1915, 1920 to enable the certificate corresponding to that certificate object. The selected certificate 1905 may be displayed with a checkmark or similar symbol to identify the certificate that is currently enabled. Thus, if a user roams with the mobile device from a first secure (i.e., private) WiFi network to a second secure WiFi network, the user can select the appropriate certificate for connecting to each secure network using the certificate selection GUI.

Figure 20B:
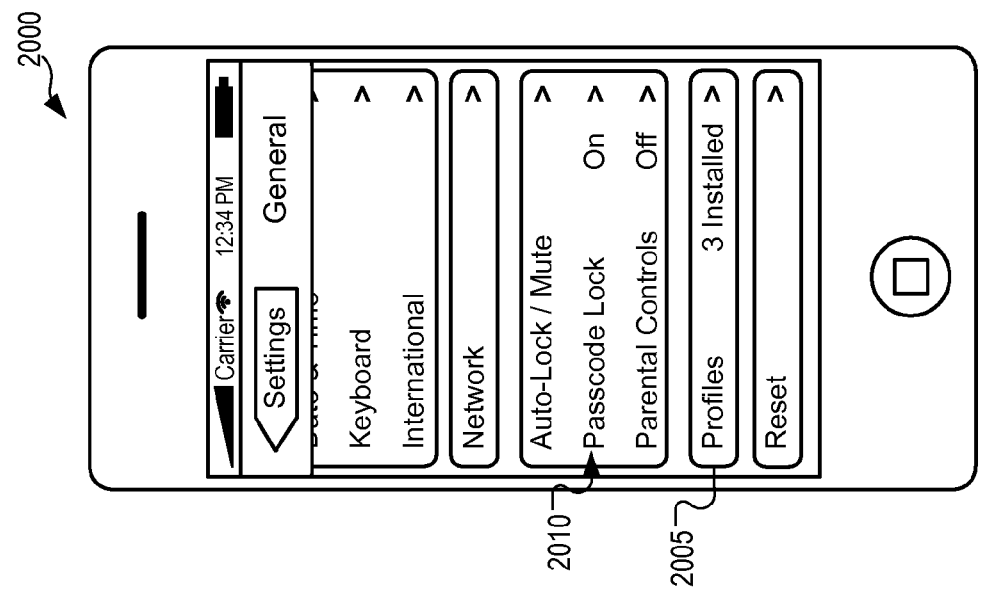
FIG. 20B shows the bottom portion of a general settings GUI.
Figure 20A:
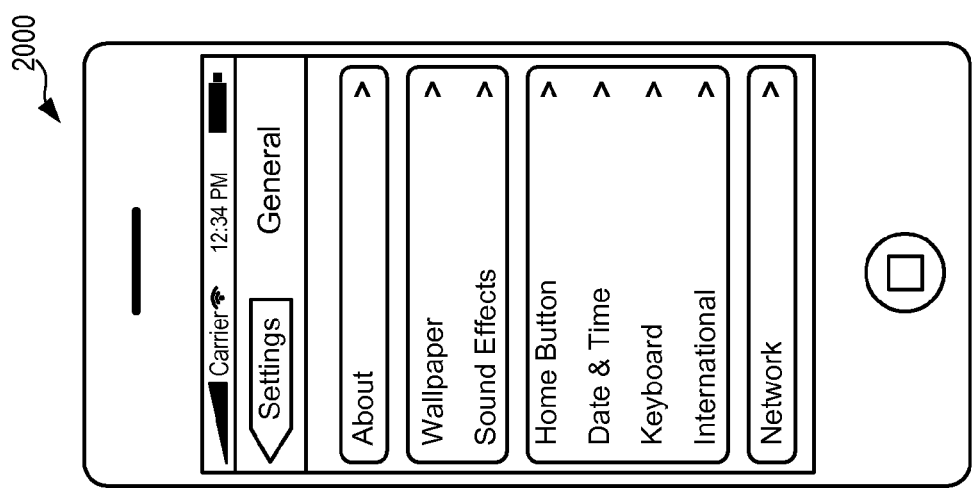
FIG. 20A illustrates the top portion of a general settings GUI.

FIGS. 20a and 20b show the top portion and bottom portion, respectively, of a general settings GUI 2000. The settings GUI 2000 permits a user to configure several settings of the mobile device 100. As shown in FIG. 20b, the GUI 2000 includes a user-selectable profiles object 2005. The object identifies the number of profiles installed on the mobile device 100. The illustrative GUI 2000 illustrated in FIG. 20b shows that there are 3 installed profiles on the mobile device 100.

Figure 21:
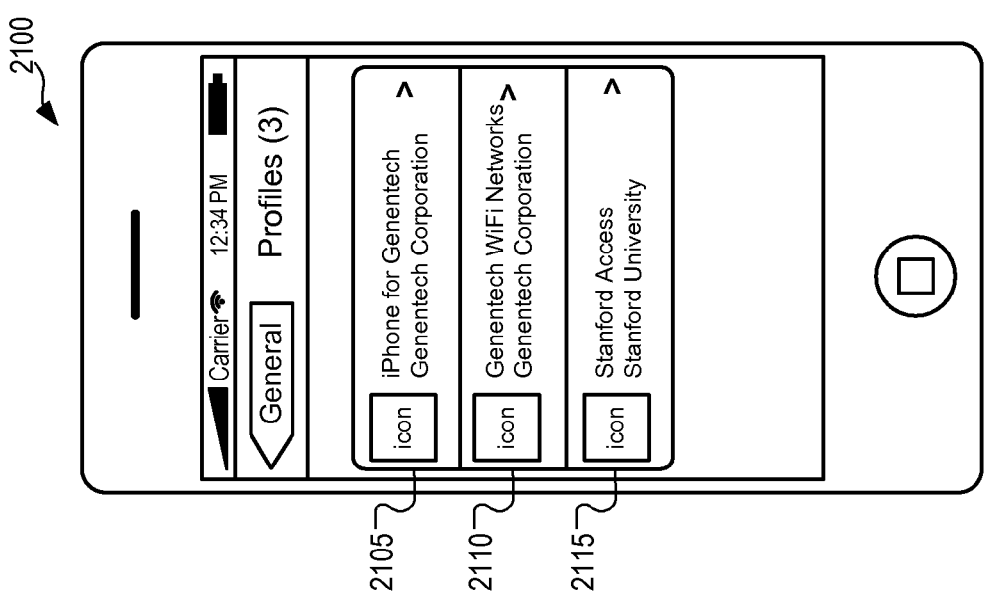
FIG. 21 illustrates an example profiles list GUI.

Selection of the profiles object 2005 causes the mobile device 100 to display a profiles list GUI, such as the example profiles list GUI 2100 shown in FIG. 21. Profile objects representing profiles are shown in list form, and each of the profile objects may be selected by a user to view profile information, and optionally, to remove the profile. FIG. 21 illustrates a GUI 2100 including three profile objects 2105, 2110, 2115. According to some implementations, one or more graphics can be included in the profiles objects such as an arrow (e.g., '>'), to indicate to a user of the mobile device 100 that each profile object is selectable by the user.

Figure 22:
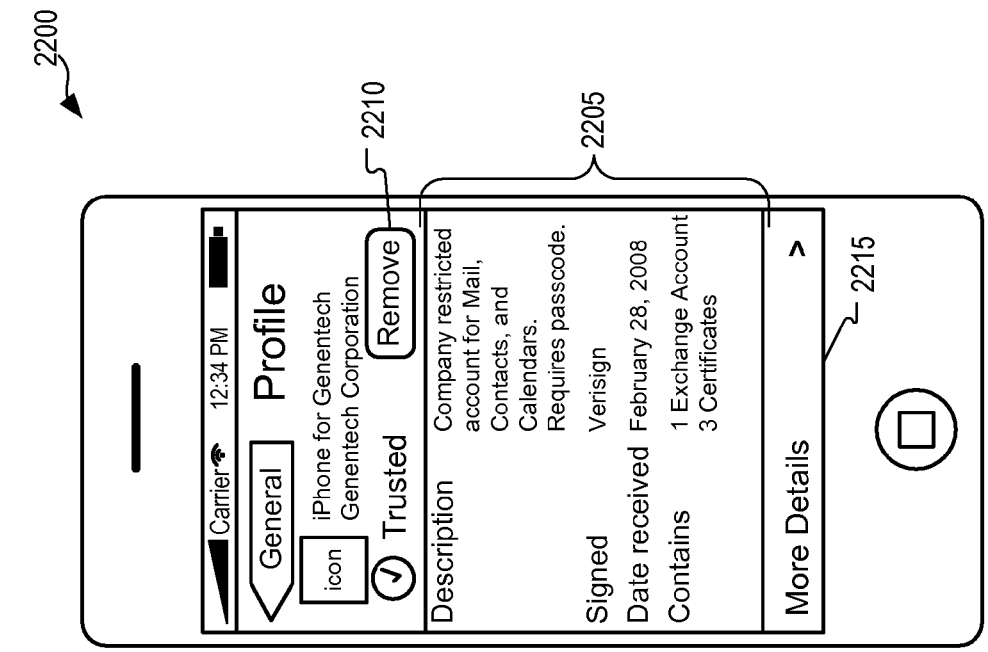
FIG. 22 illustrates an example profile information GUI.
Figure 28:
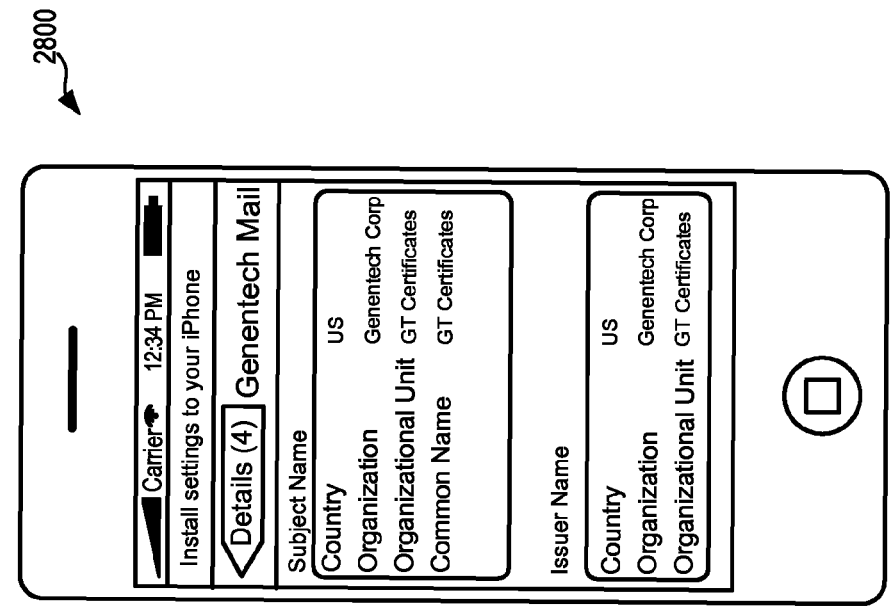
FIG. 28 illustrates an example certificate details GUI.

Selection of a profile object from the profiles list GUI causes the mobile device 100 to display a profile information GUI, such as the example profile information GUI 2200 of FIG. 22. As shown in FIG. 22, information about a profile including a description, date of receipt, and signor can be displayed in an information window 2205. A list of the contents of the profile can also be displayed. For instance, the iPhone for Genentech profile in FIG. 22 includes 1 Exchange Account and 3 Certificates. A remove object 2210 permits a user to delete the profile. According to some implementations selection of the remove object 2210 causes the mobile device 100 to present an alert to the user informing the user that removal of the profile will change settings on the device 100. Additionally, a remove object or cancel object may be displayed to the user as a confirmation request prior to removal of the profile occurring. A more details object 2215 permits a user to view additional details about the profile. For instance, certificate details shown in GUI 2800 shown in FIG. 28 may be displayed to a user upon selection of the more details object 2215.

Profile Management—Profile and Certificate Installation

FIG. 23 illustrates an example email message GUI 2300 of the mobile device 100. The email message GUI 2300 may be accessed, for instance, by user selection of the e-mail object 112 shown in FIG. 1. The example e-mail message shown in FIG. 23 includes a profile object 2310 corresponding to a profile that is delivered to the mobile device 100 via e-mail, such as an e-mail attachment. The profile object 2310 can be a user-selectable display object within the e-mail message 205. Selection of the profile object 2310 causes the mobile device 100 to display an install profile GUI, such as the example install profile GUI 2400 shown in FIG. 24. Therefore, to install a profile on the mobile device 100 a user can simply select an email-embedded profile object associated with the profile.

The example install profile GUI 2400 shown in FIG. 24 is similar to the profile information GUI 2200 of FIG. 22 because it provides information about the profile in an information window 2405, including a description, date of receipt, and signor. A list of the contents of the profile can also be displayed. For instance, the iPhone for Genentech profile in FIG. 24 includes 1 Exchange Account and 3 Certificates. Additionally, a more details object 2415 permits a user to view additional details about the profile.

Figure 25:
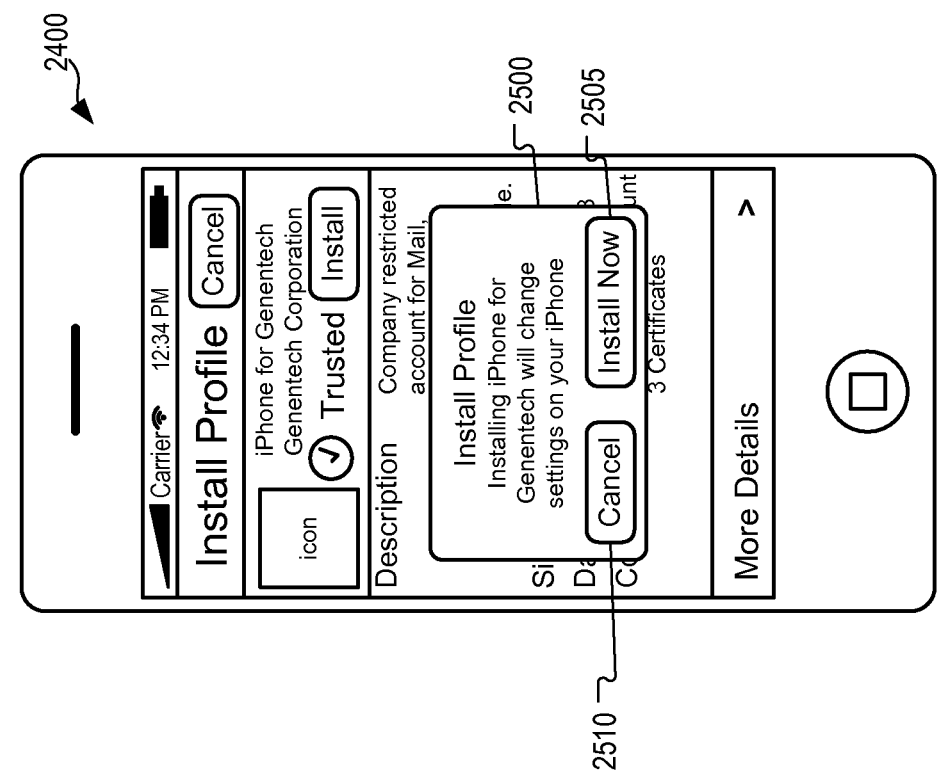
FIG. 25 illustrates an example install profile GUI including a profile alert window.

Because the profile has not yet been installed, an install object 2410 in the GUI 2400 permits a user to install the profile. Selecting the install object 2410 causes the mobile device 100 to display an install profile alert window. The profile alert window permits a user to install a profile or to cancel installation by selecting an install now object or a cancel object. In some implementations, the install profile alert window may appear in front of the install profile GUI 2400, as shown by the example profile alert window 2500 shown in FIG. 25. The profile alert window 2500 shown in FIG. 25 includes an install now object 2505 or a cancel object 2510. The install profile alert may appear as an opaque, transparent, and/or shaded overlay.

Figure 26:
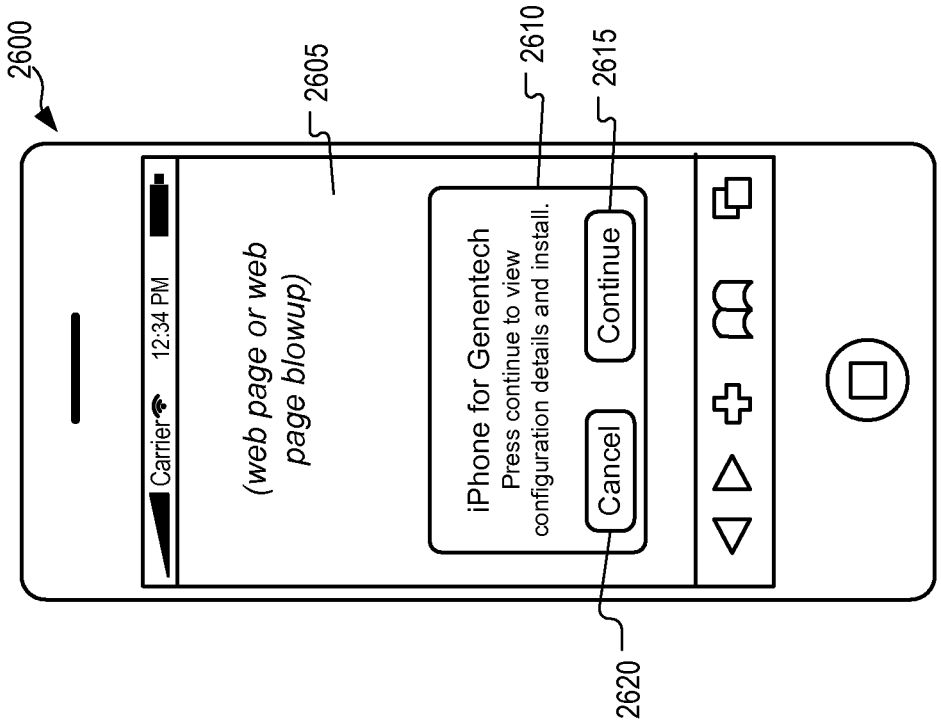
FIG. 26 illustrates an example web page installation GUI.

FIG. 26 illustrates an example web page installation GUI for installing profiles from a web page. The example web page installation GUI 2600 illustrated in FIG. 26 shows a web install object 2610 that can appear as a window when the user is using a web application of the mobile device 100, such as a web or Internet application that displays a web page (or portion thereof) 2605. In some implementations the web install object 2610 can appear as an opaque, transparent, and/or shaded overlay appearing above a web page 2605.

The web install object 2610 can include a title of the invention (in FIG. 26, 'iPhone for Genentech'), and a message that the user can press a continue object 2615 to view configuration details and to install the profile. Alternatively, the user can select a cancel object 2620 to cancel installation of the profile. If the user selects the continue object 2620 the user will be able to view details of the profile in a configuration details GUI and a certificate details GUI, such as the example GUIs 2700, 2800 shown in FIGS. 27 and 28.

Figure 27:
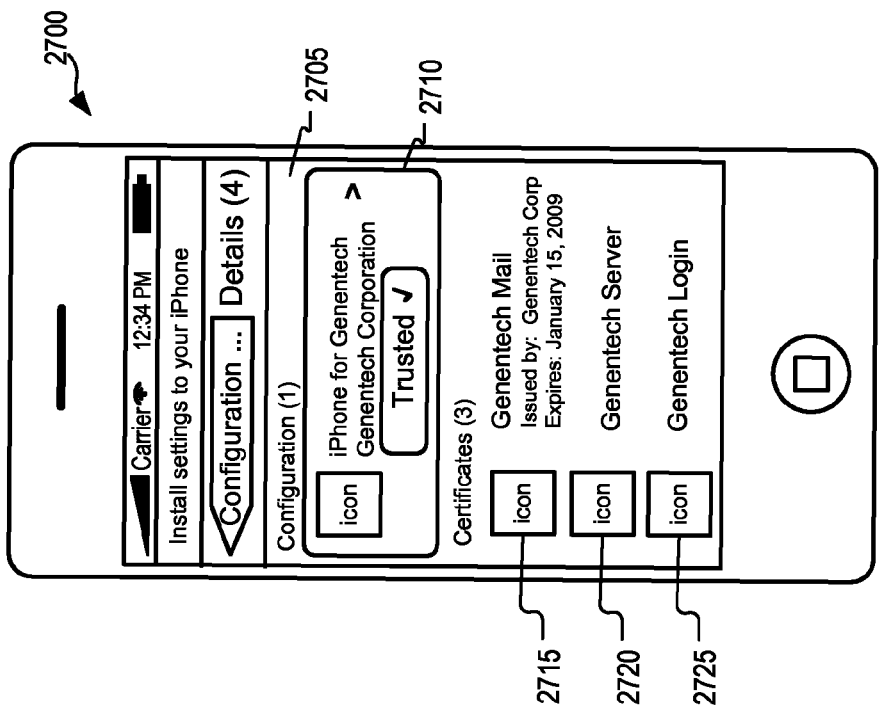
FIG. 27 illustrates an example configuration details GUI.

FIG. 27 illustrates an example configuration details GUI 2700. The configuration details GUI lists details of a profile, such as a profile to be installed from the web via the web install object 2610. The GUI 2700 shown in FIG. 27 includes a details window 2705 that includes a configuration object 2710 and three certificates objects 2715, 2720, 2725 identifying certificates included within the profile. Each certificate object within the profile may be selected to provide still additional details about the certificates, as is shown in the example certificate details GUI 2700 of FIG. 28.

Installation of a profile can occur from the example configuration details GUI via selection of the configuration object. For instance, selecting the configuration object 2710 in the example configuration details GUI 2700 causes the mobile device 100 to display the install profile GUI, such as the install profile GUI 2400 shown in FIG. 24. Thereafter a user may proceed with the install as described above with reference to FIGS. 24 and 25.

Figure 29:
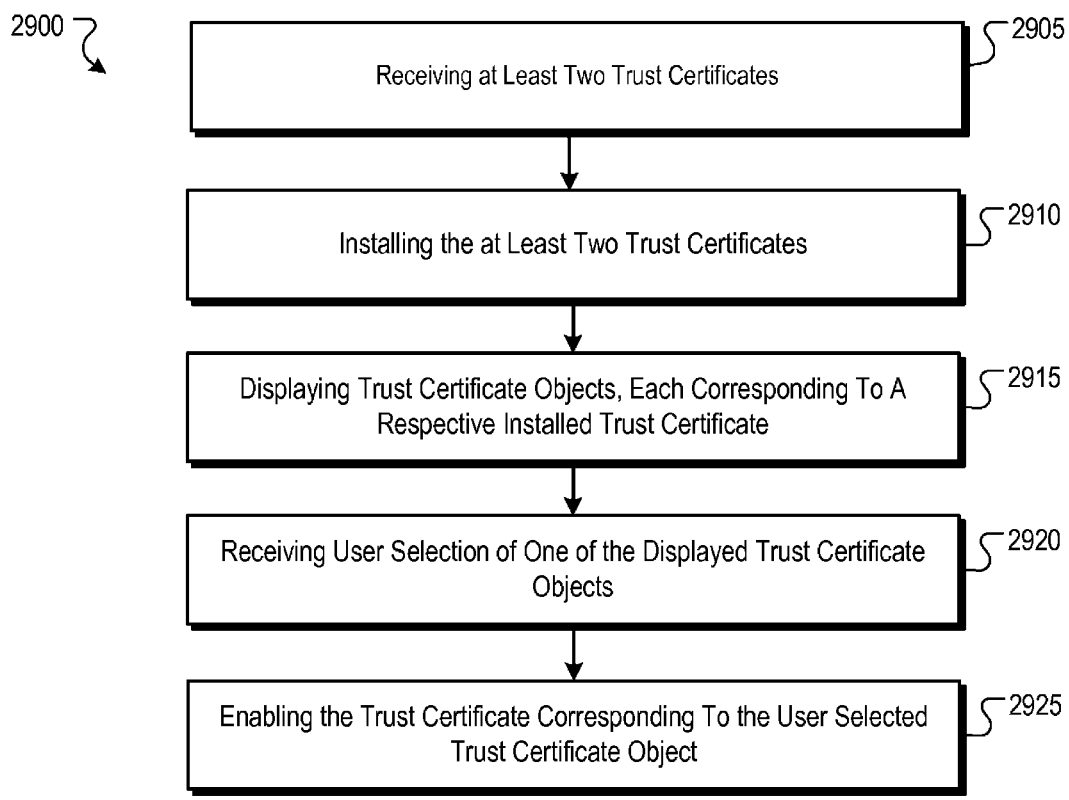
FIG. 29 illustrates an example process for receiving a user selection of a trust certificate.

FIG. 29 illustrates an example process 2900 for receiving a user selection of a trust certificate. At least two trust certificates are received 2905 by the mobile device 100. The at least two trust certificates are then installed 2910. Next, trust certificate objects are displayed, each corresponding to a respective installed trust certificate 2915. For instance, the trust certificate objects may be displayed in list form on a GUI.

A user selection of one of the displayed trust certificate objects is received 2920. The trust certificate corresponding to the user selected trust certificate object is then enabled 2925, for instance, by the mobile device 100.

Figure 30:
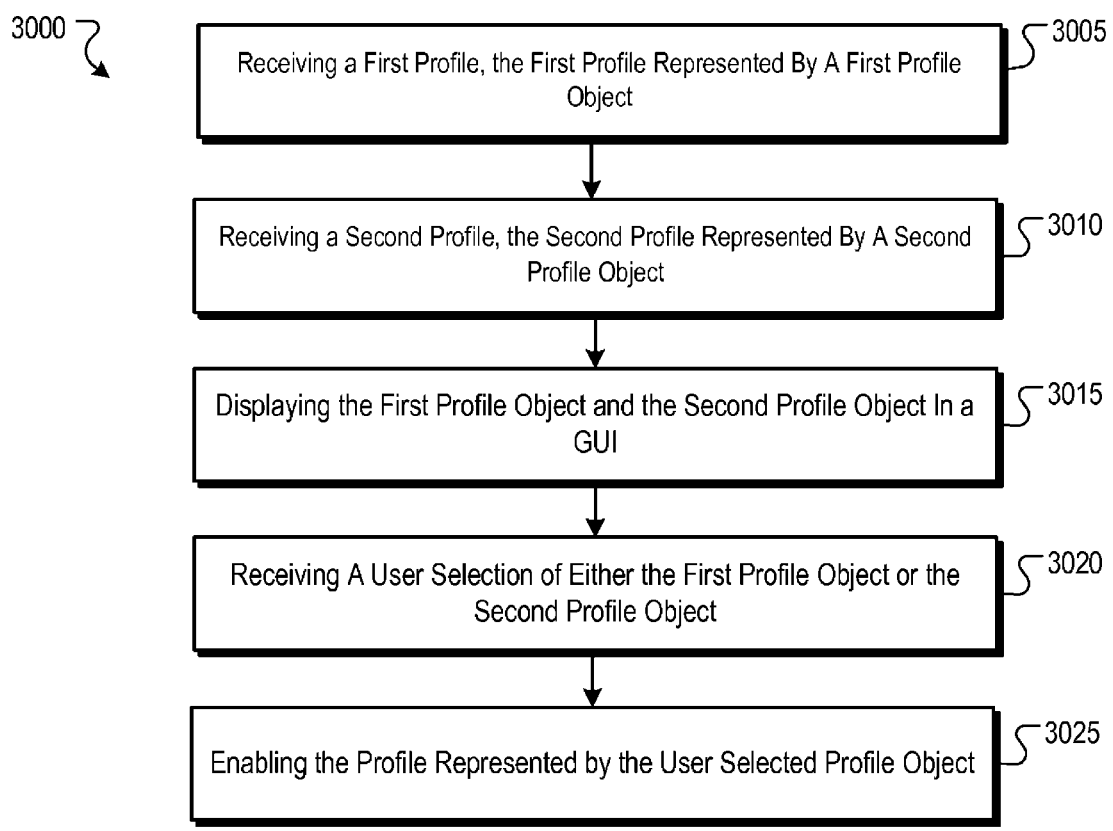
FIG. 30 illustrates an example process for enabling one of two or more stored profiles.

FIG. 30 illustrates an example process 3000 for enabling one of two or more stored profiles. A first profile is received 3005, where the first profile is represented by a first profile object. A second profile is received 3010, where the second profile is represented by a second profile object. According to some implementations, the first and/or second profiles can be received at the mobile device as an email attachment or via a web page.

Next, the first profile object and the second profile object is displayed 3015 in a GUI, such as the GUI 2100 shown in FIG. 21. A user selection of either the first profile object or the second profile object is received 3020. Thereafter, the profile represented by the user selected profile object is enabled by the mobile device 3025.

Figure 31:
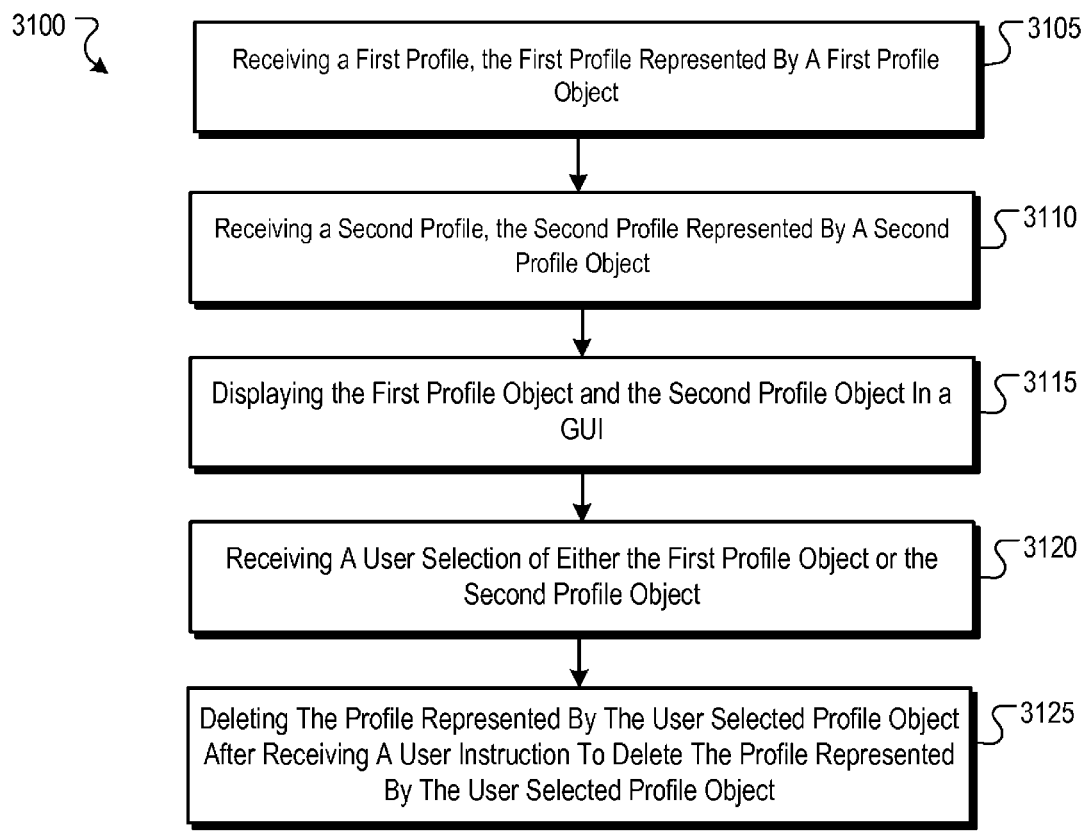
FIG. 31 illustrates an example process for deleting a profile.

FIG. 31 illustrates an example process 3100 for deleting a profile. First and second profiles, each represented by profile objects, are received 3105, 3110. According to some implementations, the first and/or second profiles can be received at the mobile device as an email attachment or via a web page.

The first profile object and the second profile object are displayed in a GUI 3115, for instance, in list form. For instance, the first and second profile objects may be displayed in the GUI 2100 shown in FIG. 21. A user selection of either the first profile object or the second profile object is received 3120. The mobile device 100 will delete the profile represented by the user selected profile object after receiving a user instruction to delete the profile represented by the user selected profile object 3125.

Passcode Lock

According to some implementations, the mobile device 100 allows different passcodes to be used for each profile stored by the mobile device 100.

Figure 32:
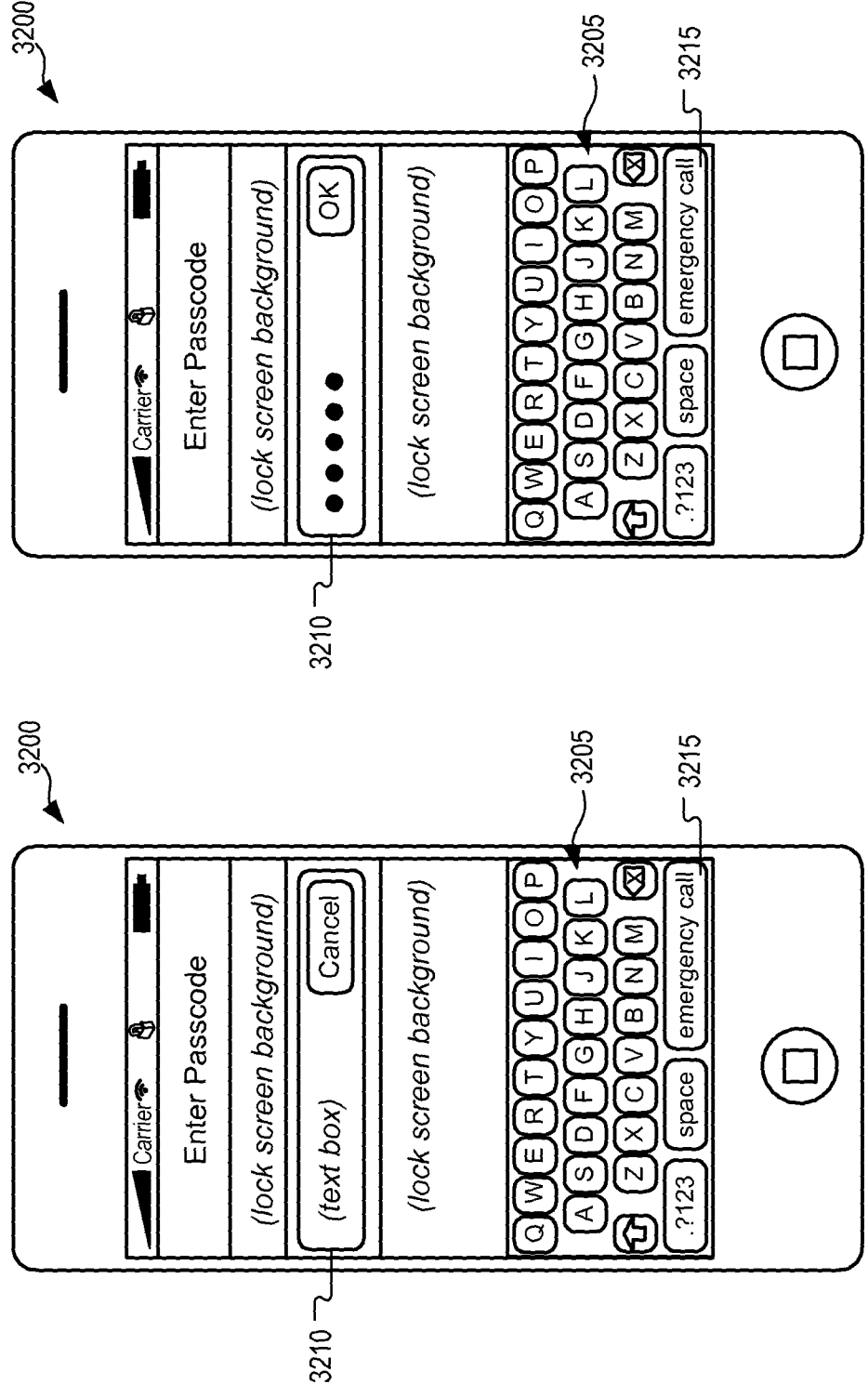
FIGS. 32A and 32B illustrate an example passcode lock GUI.

FIGS. 32A and 32B illustrate an example passcode lock GUI 3200. The passcode lock GUI 3200 can represent an interface that a user accesses by selecting a passcode lock object, such as the passcode lock object 2010 shown in FIG. 20b. The passcode lock GUI 3200 includes a text box 3210 in which a user must enter the correct profile passcode prior to using one or more profiles of the device. A user can enter a passcode using the keyboard 3205. Although an alpha numeric keyboard is shown, the keyboard can also toggle to or include a numeric keyboard. Thus, each profile may be associated with a passcode that must be entered in the text box 3210 prior to use of the profile. According to some implementations, a passcode may be required to use any features of the mobile device 100.

As shown in FIG. 32B, the passcode may be hidden from view while it is typed into the text box 3210 using the keyboard 3205. The passcode may be an alpha numeric passcode, a digit passcode, or a combination thereof. As is also shown in FIGS. 32A and 32B, an emergency call object 3215 may be included within the keyboard 3205 to make an emergency call (e.g., to 911) using the mobile device 100.

Figure 33:
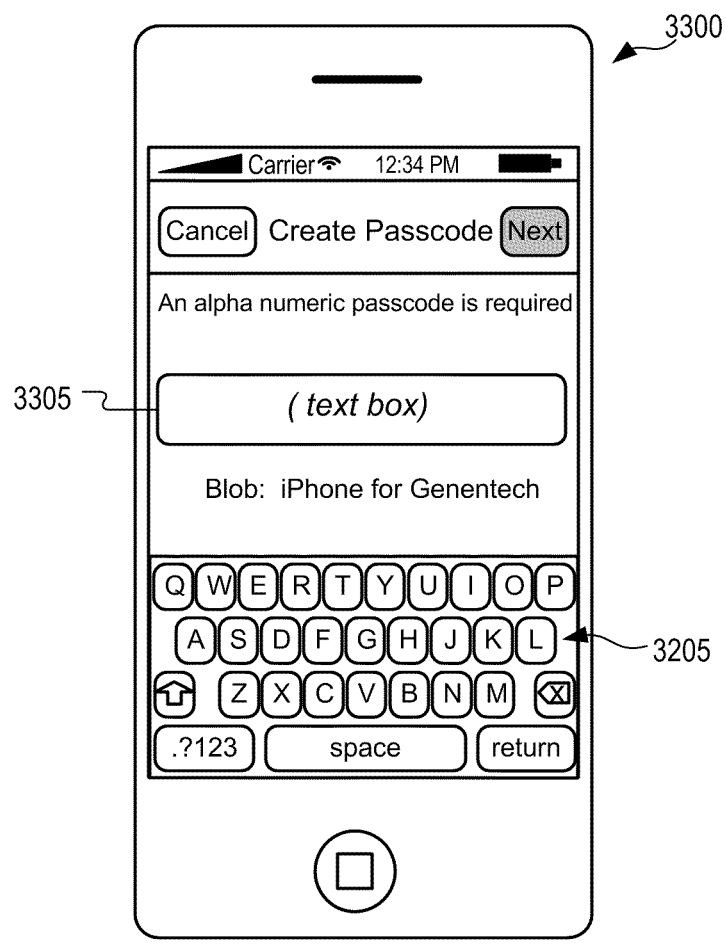
FIG. 33 illustrates an example create passcode GUI.

FIG. 33 illustrates an example create passcode GUI 3300. The create passcode GUI 3300 can represent an interface that a user accesses by selecting a passcode lock object, such as the passcode lock object 2010 shown in FIG. 20b. According to some implementations, a user may have to identify a profile to be associated with a newly created passcode. Alternatively, if a passcode already exists a user may be required to enter a correct profile passcode prior to altering the passcode. A new passcode can be entered in a new passcode text box 3305 using the keyboard 3205. According to some implementations, an alpha numeric passcode is required. According to other implementations, the passcode may require two or more special characters. Additionally, the passcode may have to be typed into the text box 3305 twice consecutively prior to it becoming effective.

Figure 34:
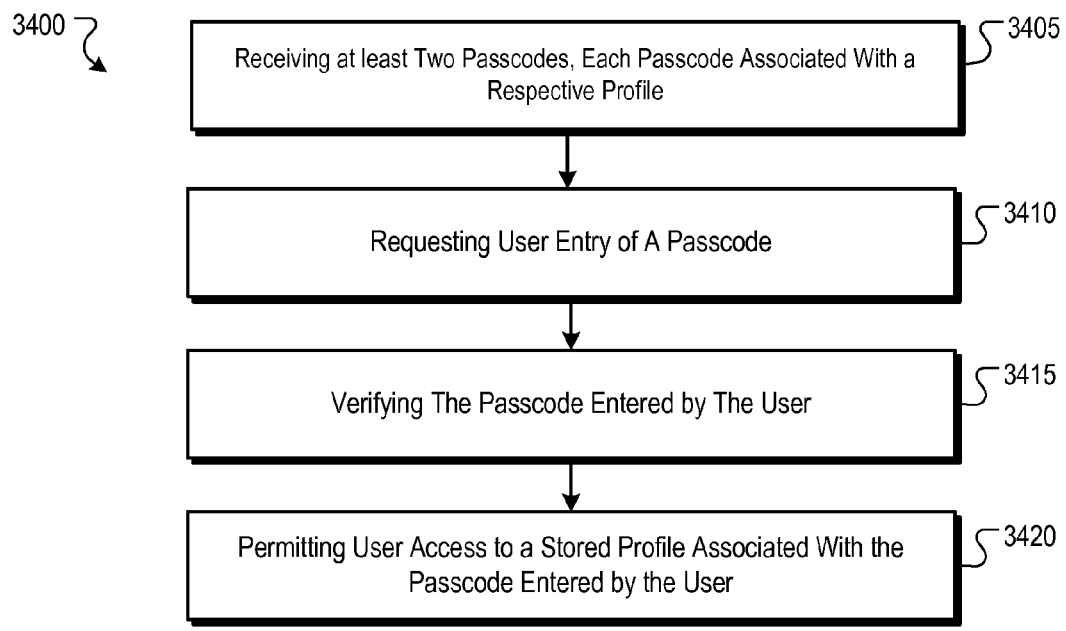
FIG. 34 illustrates an example process for receiving a passcode associated with a profile.

FIG. 34 illustrates an example process 3400 for receiving a passcode associated with a profile. At least two different passcodes may be received 3405 by a mobile device 100, where each passcode is associated with a respective profile. According to some implementations, the passcodes may be entered by a user using a create passcode GUI.

When the mobile device is locked, the user may be requested to enter a passcode 3410. The user can then enter the passcode, for instance, using a passcode lock GUI, such as the example GUI 3200 described with respect to FIG. 32. The mobile device 100 will verify the passcode entered by the user 3415. For instance, the mobile device 100 can compare the passcode entered by the user with a list of passcodes to determine if the user has entered a correct passcode. The mobile device 100 can also look up a profile associated with the stored passcode. For instance, the mobile device 100 can include a table of passcode-profile pairs to identify associated passcodes and profiles. The mobile device 100 can then permit the user to access to the device in accordance with the stored profile associated with the passcode entered by the user 3420.

Network Operating Environment

Figure 35:
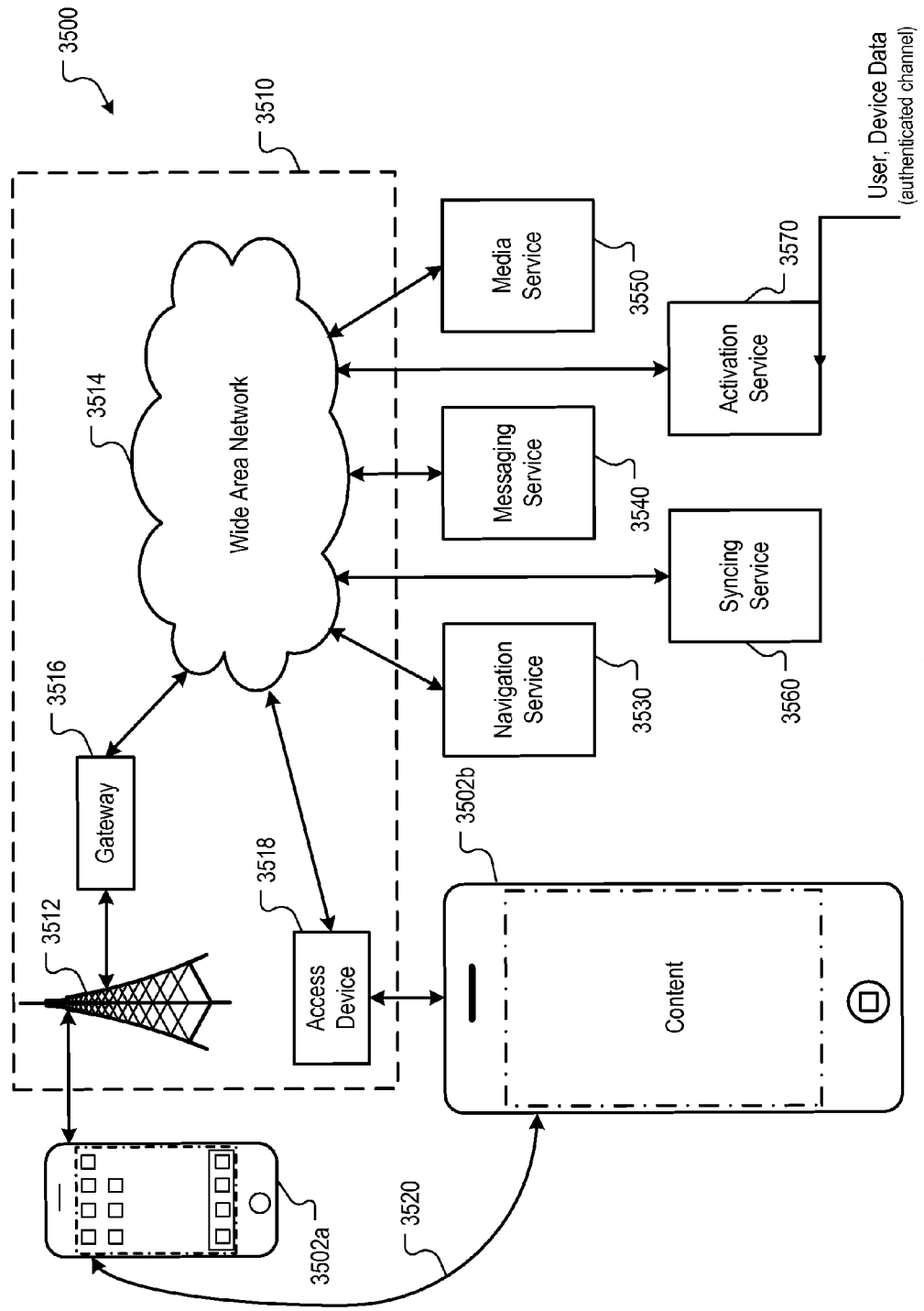
FIG. 35 is a block diagram of an example network operating environment for the mobile device of FIG. 1.

FIG. 35 is a block diagram of an example network operating environment 3500. In FIG. 35, mobile devices 3502*a* and 3502*b* each can represent mobile device 100. Mobile devices 3502*a* and 3502*b* can, for example, communicate over one or more wired and/or wireless networks 3510 in data communication. For example, a wireless network 3512, e.g., a cellular network, can communicate with a wide area network (WAN) 3514, such as the Internet, by use of a gateway 3516. Likewise, an access device 3518, such as an 802.11g wireless access device, can provide communication access to the wide area network 3514. In some implementations, both voice and data communications can be established over the wireless network 3512 and the access device 3518. For example, the mobile device 3502*a* can place and receive phone calls (e.g., using VoIP protocols), send and receive e-mail messages (e.g., using POP3 protocol), and retrieve electronic documents and/or streams, such as web pages, photographs, and videos, over the wireless network 3512, gateway 3516, and wide area network 3514 (e.g., using TCP/IP or UDP protocols). Likewise, in some implementations, the mobile device 3502*b* can place and receive phone calls, send and receive e-mail messages, and retrieve electronic documents over the access device 3518 and the wide area network 3514. In some implementations, the mobile device 3502*a* or 3502*b* can be physically connected to the access device 3518 using one or more cables and the access device 3518 can be a personal computer. In this configuration, the mobile device 3502*a* or 3502*b* can be referred to as a "tethered" device.

The mobile devices 3502*a* and 3502*b* can also establish communications by other means. For example, the wireless device 3502*a* can communicate with other wireless devices, e.g., other mobile devices 3502*a* or 3502*b*, cell phones, etc., over the wireless network 3512. Likewise, the mobile devices 3502*a* and 3502*b* can establish peer-to-peer communications 3520, e.g., a personal area network, by use of one or more communication subsystems, such as the Bluetooth™ communication devices 188 shown in FIG. 1. Other communication protocols and topologies can also be implemented.

The mobile device 3502*a* or 3502*b* can, for example, communicate with one or more services 3530, 3540, 3550, 3560, and 3570 over the one or more wired and/or wireless networks 3510. For example, a navigation service 3530 can provide navigation information, e.g., map information, location information, route information, and other information, to the mobile device 3502*a* or 3502*b*. A user of the mobile device 3502*b* can invoke a map functionality, e.g., by pressing the maps object 144 on the top-level GUI shown in FIG. 1, and can request and receive a map for a particular location.

A messaging service 3540 can, for example, provide e-mail and/or other messaging services. A media service 3550 can, for example, provide access to media files, such as song files, audio books, movie files, video clips, and other media data. In some implementations, separate audio and video services (not shown) can provide access to the respective types of media files. A syncing service 3560 can, for example, perform syncing services (e.g., sync files). An activation service 3570 can, for example, perform an activation process for activating the mobile device 3502*a* or 3502*b*. Other services can also be provided, including a software update service that automatically determines whether software updates exist for software on the mobile device 3502*a* or 3502*b*, then downloads the software updates to the mobile device 3502*a* or 3502*b* where the software updates can be manually or automatically unpacked and/or installed.

The mobile device 3502*a* or 3502*b* can also access other data and content over the one or more wired and/or wireless networks 3510. For example, content publishers, such as news sites, RSS feeds, web sites, blogs, social networking sites, developer networks, etc., can be accessed by the mobile device 3502*a* or 3502*b*. Such access can be provided by invocation of a web browsing function or application (e.g., a browser) in response to a user touching the Web object 114.

Example Mobile Device Architecture

Figure 36:
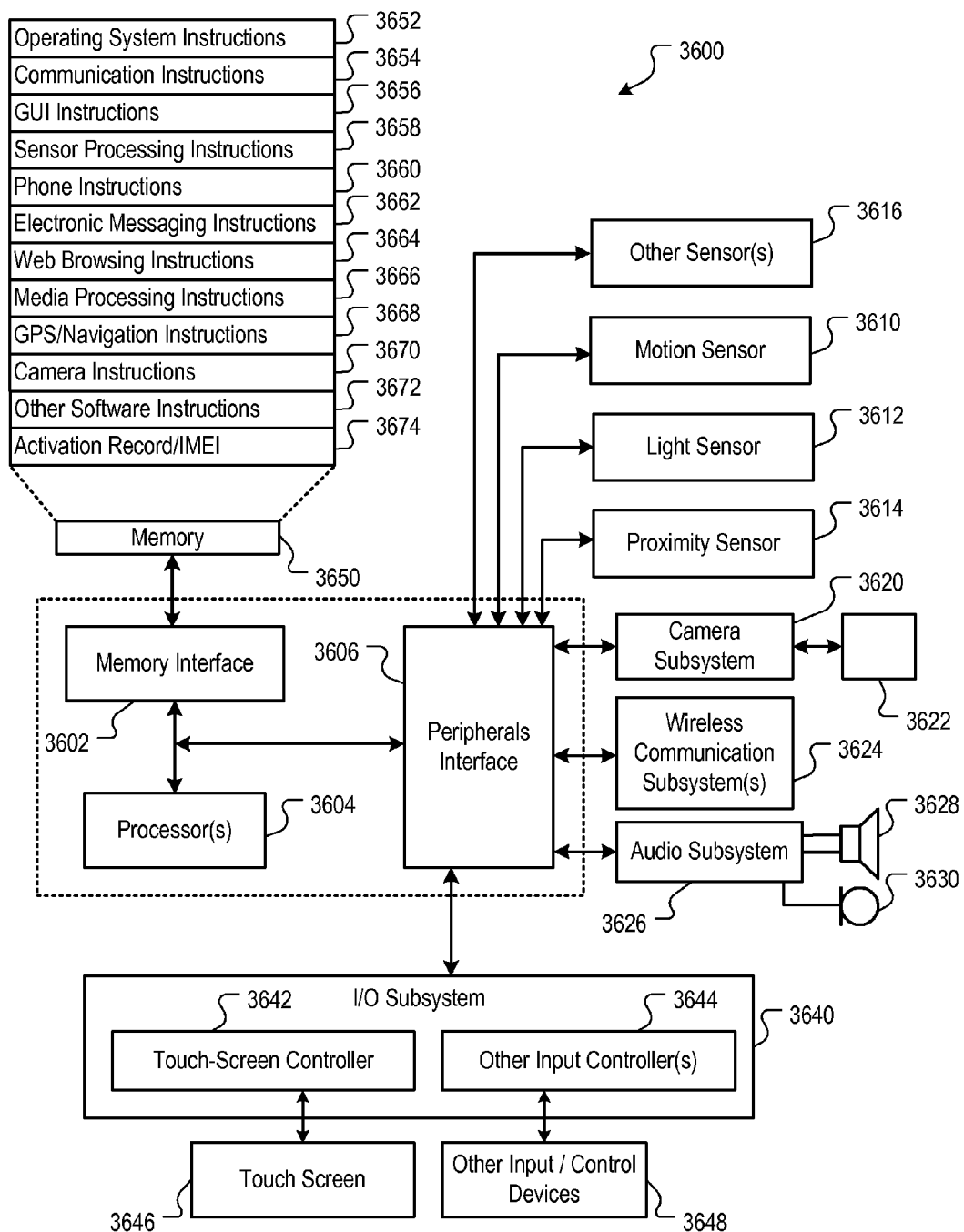
FIG. 36 is a block diagram of an example implementation of the mobile device of FIG. 1.

FIG. 36 is a block diagram 3600 of an example implementation of the mobile device 100 of FIG. 1. The mobile device 100 can include a memory interface 3602, one or more data processors, image processors and/or central processing units 3604, and a peripherals interface 3606. The memory interface 3602, the one or more processors 3604 and/or the peripherals interface 3606 can be separate components or can be integrated in one or more integrated circuits. The various components in the mobile device 100 can be coupled by one or more communication buses or signal lines.

Sensors, devices, and subsystems can be coupled to the peripherals interface 3606 to facilitate multiple functionalities. For example, a motion sensor 3610, a light sensor 3612, and a proximity sensor 3614 can be coupled to the peripherals interface 3606 to facilitate the orientation, lighting, and proximity functions described with respect to FIG. 1. Other sensors 3616 can also be connected to the peripherals interface 3606, such as a positioning system (e.g., GPS receiver), a temperature sensor, a biometric sensor, or other sensing device, to facilitate related functionalities.

A camera subsystem 3620 and an optical sensor 3622, e.g., a charged coupled device (CCD) or a complementary metal-oxide semiconductor (CMOS) optical sensor, can be utilized to facilitate camera functions, such as recording photographs and video clips.

Communication functions can be facilitated through one or more wireless communication subsystems 3624, which can include radio frequency receivers and transmitters and/or optical (e.g., infrared) receivers and transmitters. The specific design and implementation of the communication subsystem 3624 can depend on the communication network(s) over which the mobile device 100 is intended to operate. For example, a mobile device 100 may include communication subsystems 3624 designed to operate over a GSM network, a GPRS network, an EDGE network, a Wi-Fi or WiMax network, and a Bluetooth™ network. In particular, the wireless communication subsystems 3624 may include hosting protocols such that the device 100 may be configured as a base station for other wireless devices.

An audio subsystem 3626 can be coupled to a speaker 3628 and a microphone 3630 to facilitate voice-enabled functions, such as voice recognition, voice replication, digital recording, and telephony functions.

The I/O subsystem 3640 can include a touch screen controller 3642 and/or other input controller(s) 3644. The touch-screen controller 3642 can be coupled to a touch screen 3646. The touch screen 3646 and touch screen controller 3642 can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen 3646.

The other input controller(s) 3644 can be coupled to other input/control devices 3648, such as one or more buttons, rocker switches, thumb-wheel, infrared port, USB port, and/or a pointer device such as a stylus. The one or more buttons (not shown) can include an up/down button for volume control of the speaker 3628 and/or the microphone 3630.

In one implementation, a pressing of the button for a first duration may disengage a lock of the touch screen 3646; and a pressing of the button for a second duration that is longer than the first duration may turn power to the mobile device 100 on or off. The user may be able to customize a functionality of one or more of the buttons. The touch screen 3646 can, for example, also be used to implement virtual or soft buttons and/or a keyboard.

In some implementations, the mobile device 100 can present recorded audio and/or video files, such as MP3, AAC, and MPEG files. In some implementations, the mobile device 100 can include the functionality of an MP3 player, such as an iPod™. The mobile device 100 may, therefore, include a 36-pin connector that is compatible with the iPod. Other input/output and control devices can also be used.

The memory interface 3602 can be coupled to memory 3650. The memory 3650 can include high-speed random access memory and/or non-volatile memory, such as one or more magnetic disk storage devices, one or more optical storage devices, and/or flash memory (e.g., NAND, NOR). The memory 3650 can store an operating system 3652, such as Darwin, RTXC, LINUX, UNIX, OS X, WINDOWS, or an embedded operating system such as VxWorks. The operating system 3652 may include instructions for handling basic system services and for performing hardware dependent tasks. In some implementations, the operating system 3652 can be a kernel (e.g., UNIX kernel), as described in reference to FIGS. 4A and 4B.

The memory 3650 may also store communication instructions 3654 to facilitate communicating with one or more additional devices, one or more computers and/or one or more servers. The memory 3650 may include GUI instructions 3656 to facilitate graphic user interface processing; sensor processing instructions 3658 to facilitate sensor-related processing and functions; phone instructions 3660 to facilitate phone-related processes and functions; electronic messaging instructions 3662 to facilitate electronic-messaging related processes and functions; web browsing instructions 3664 to facilitate web browsing-related processes and functions; media processing instructions 3666 to facilitate media processing-related processes and functions; GPS/Navigation instructions 3668 to facilitate GPS and navigation-related processes and instructions; camera instructions 3670 to facilitate camera-related processes and functions; and/or other software instructions 3672 to facilitate other processes and functions, e.g., security processes and functions as described in reference to FIGS. 4A and 4B. The memory 3650 may also store other software instructions (not shown), such as web video instructions to facilitate web video-related processes and functions; and/or web shopping instructions to facilitate web shopping-related processes and functions. In some implementations, the media processing instructions 3666 are divided into audio processing instructions and video processing instructions to facilitate audio processing-related processes and functions and video processing-related processes and functions, respectively. An activation record and International Mobile Equipment Identity (IMEI) 3674 or similar hardware identifier can also be stored in memory 3650.

Each of the above identified instructions and applications can correspond to a set of instructions for performing one or more functions described above. These instructions need not be implemented as separate software programs, procedures, or modules. The memory 3650 can include additional instructions or fewer instructions. Furthermore, various functions of the mobile device 100 may be implemented in hardware and/or in software, including in one or more signal processing and/or application specific integrated circuits.

Software Stack and Security Process

Figure 37A:
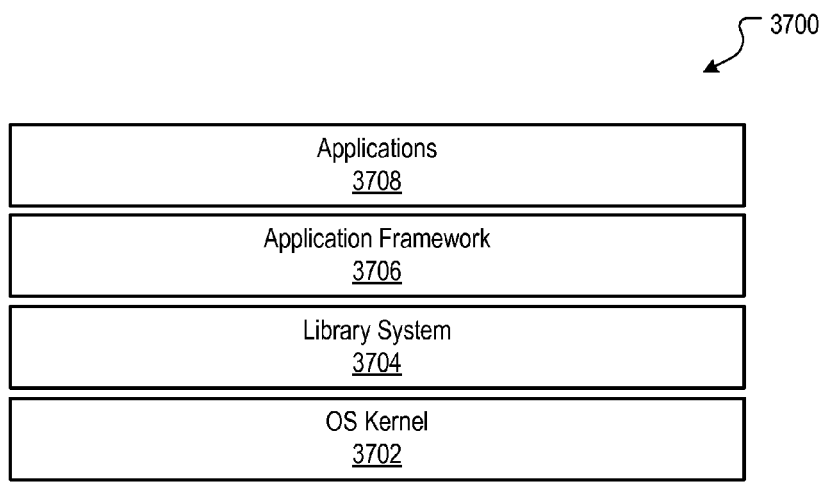
FIG. 37A illustrates an example implementation of a software stack for the mobile device of FIG. 1.

FIG. 37A illustrates an example implementation of a software stack 3700 for the mobile device of FIG. 1. In some implementations, the software stack 3700 includes an operating system (OS) kernel 3702 (e.g., a UNIX kernel), a library system 3704, an application framework 3706 and an applications layer 3708.

The OS kernel 3702 manages the resources of the mobile device 100 and allows other programs to run and use these resources. Some examples of resources include a processor, memory, and I/O. For example, the kernel 3702 can determine which running processes should be allocated to a processor, processors or processor cores, allocates memory to the processes and allocates requests from applications and remote services to perform I/O operations. In some implementations, the kernel 3702 provides methods for synchronization and inter-process communications with other devices.

In some implementations, the kernel 3702 can be stored in non-volatile memory of the mobile device 100. When the mobile device 100 is turned on, a boot loader starts executing the kernel 102 in supervisor mode. The kernel then initializes itself and starts one or more processes for the mobile device 100, including a security process 3710 for remote access management, as described in reference to FIG. 37B.

The library system 3704 provides various services for applications running in the application layer 3708. Such services can include audio services, video services, database services, image processing services, graphics services, etc.

The application framework 3706 provides an object-oriented application environment including classes and Application Programming Interfaces (APIs) that can be used by developers to build applications using well-known programming languages (e.g., Objective-C, Java).

The applications layer 3708 is where various applications exist in the software stack 3700. Developers can use the APIs and environment provided by the application framework 3706 to build applications, such as the applications represented by the display object 104 shown in FIG. 1 (e.g., email, media player, Web browser, phone).

Secure Communication Channel

Figure 37B:
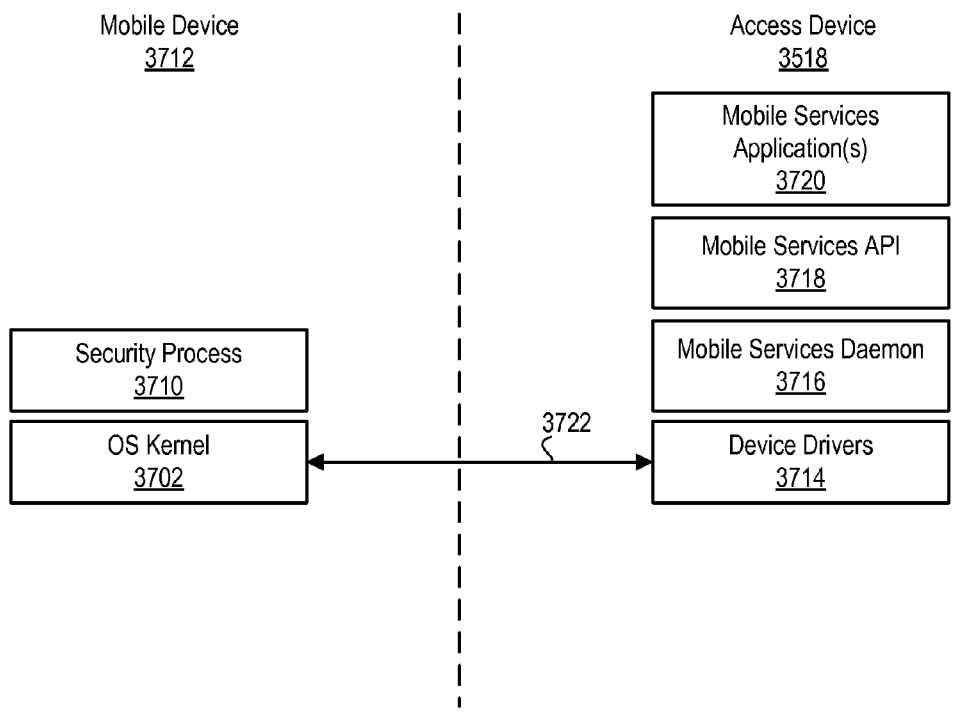
FIG. 37B illustrates an example implementation of a security process for remote access management over a secure communications channel.

FIG. 37B illustrates an example implementation of a security process 3710 for remote access management over a secure communications channel 3722. In the example shown, the mobile device 3712, e.g., mobile device 100, is running the security process 3710, which communicates with the OS kernel 3702. Any remote access requests made to the kernel 3702 are intercepted by the security process 3710, which is responsible for setting up secure communication sessions between the mobile device 3712 and a mobile services access device 3518. In some implementations, the process 3710 uses a cryptographic protocol, such as Secure Sockets Layer (SSL) or Transport Layer Security (TLS) to provide secure communications between the mobile device 3712 and the access device 3518. The access device 3518 can be any device with network connectivity, including but not limited to: a personal computer, a hub, an Ethernet card, another mobile device, a wireless base station, etc. The secure communications channel can be a Universal Serial Bus (USB), Ethernet, a wireless link (e.g., Wi-Fi, WiMax, 3G), an optical link, infrared link, FireWire™, or any other known communications channel or media.

In the example shown, the access device 3518 includes device drivers 3714, a mobile services daemon 3716, a mobile services API 3718 and one or more mobile service applications 3720. The device drivers 3714 are responsible for implementing the transport layer protocol, such as TCP/IP over USB. The mobile services daemon 3716 listens (e.g., continuously) to the communications channel 3722 for activity and manages the transmission of commands and data over the communication channel 3722. The mobile services API 3718 provides a set of functions, procedures, variables and data structures for supporting requests for services made by the mobile services application 3720. The mobile services application 3720 can be a client program running on the access device 3518, which provides one or more user interfaces for allowing a user to interact with a remote service (e.g., activation service 3570) over a network (e.g., the Internet, wireless network, peer-to-peer network, optical network, Ethernet, intranet). In some implementations, a device activation process can be used, as described in co-pending U.S. patent application Ser. No. 11/767,447, filed Jun. 22, 2007, for "Device Activation and Access," which patent application is incorporated by reference herein in its entirety. The application 3720 can allow a user to set preferences, download or update files of content or software, search databases, store user data, select services, browse content, perform financial transactions, or engage in any other online service or function. An example of a mobile services application 3720 is the iTunes™ client, which is publicly available from Apple Inc. (Cupertino, Calif.). An example of a mobile device 3712 that uses the iTunes™ client is the iPod™ product developed by Apple Inc. Another example of a mobile device 3712 that uses the iTunes™ client is the iPhone™ product developed by Apple Inc.

In an example operational mode, a user connects the mobile device 3712 to the access device 3518 using, for example, a USB cable. In other implementations, the mobile device 3712 and access device 3518 include wireless transceivers for establishing a wireless link (e.g., Wi-Fi). The drivers 3714 and kernel 3702 detect the connection and alert the security process 3710 and mobile services daemon 3716 of the connection status. Once the connection is established, certain non-sensitive information can be passed from the mobile device 3712 to the access device 3518 (e.g., name, disk size, activation state) to assist in establishing a secure communication session.

In some implementations, the security process 3710 establishes a secure communication session (e.g., encrypted SSL session) with the access device 3518 by implementing a secure network protocol. For example, if using SSL protocol, the mobile device 3712 and access device 3518 will negotiate a cipher suite to be used during data transfer, establish and share a session key, and authenticate the access device 3518 to the mobile device 3712. In some implementations, if the mobile device 3712 is password protected, the security process 3710 will not establish a session, and optionally alert the user of the reason for failure.

Once a secure session is successfully established, the mobile device 3712 and the access device 3518 can exchange sensitive information (e.g., passwords, personal information), and remote access to the mobile device 3712 can be granted to one or more services (e.g., navigation service 3530, messaging service 3540, media service 3550, syncing service 3560, activation service 3570). In some implementations, the mobile services daemon 3716 multiplexes commands and data for transmission over the communication channel 3722. This multiplexing allows several remote services to have access to the mobile device 3712 in a single session without the need to start a new session (or handshaking) for each service requesting access to the mobile device 3712.

The invention claimed is:

1. A method comprising:
receiving an invitation object, the invitation object including an event notification;
in response to selecting the invitation object and before a view of a calendar is displayed, generating, by a processor, a calendar field, and displaying the calendar field via a user interface, wherein the user interface includes a list of a plurality of calendars displayed as a toggle selection, wherein each of the plurality of calendars are stored both on a mobile device and a remote server, and wherein each of the plurality of calendars is a daily calendar, weekly calendar, or monthly calendar, and labeled as a work calendar, a home calendar, or a birthday calendar;
receiving an input selecting multiple calendars from the plurality of calendars through the user interface;
associating, by a processor, the invitation object with the selected calendars; and
displaying the invitation object using visual effects on the selected calendars.

2. The method of claim 1, comprising providing for display the invitation object in a composite calendar, the composite calendar including the invitation object displayed in the visual effects and an event object associated with an unselected calendar, wherein providing for display the composite calendar comprises:
displaying each of the invitation object and event object as respective event blocks in the composite calendar.

3. The method of claim 2, wherein the calendar field includes an identifier of a current calendar.

4. The method of claim 2, wherein the visual effects comprise shading in a distinct shade or coloring in a distinct color.

5. The method of claim 1, wherein each of the calendars in the list is scrollable, when displayed, in response to a touch input on a display screen.

6. The method of claim 1 further comprising:
generating an invitation review interface for display, the invitation review interface including the invitation object and a graphic indicating that the invitation object is not accepted or rejected; and
receiving an input selecting the invitation object through the invitation review interface.

7. The method of claim 6 further comprising:
generating a pop-up invitation object for display within an application window, the pop-up invitation object indicating the receipt of the invitation object.

8. A non-transitory computer-readable storage medium storing instructions operable to cause a processor to perform operation comprising:
receiving an invitation object, the invitation object including an event notification;
in response to selecting the invitation object and before a view of a calendar is displayed, generating, by a processor, a calendar field, and displaying the calendar field via a user interface, wherein the user interface includes a list of a plurality of calendars displayed as a toggle selection, wherein each of the plurality of calendars are stored both on a mobile device and a remote server, and wherein each of the plurality of calendars is a daily calendar, weekly calendar, or monthly calendar, and labeled as a work calendar, a home calendar, or a birthday calendar;

receiving an input selecting multiple calendars from the plurality of calendars through the user interface;

associating, by a processor, the invitation object with the selected calendars; and displaying the invitation object using visual effects on the selected calendars.

9. The non-transitory computer-readable storage medium of claim 8, further comprising:

displaying the invitation object in a composite calendar, the composite calendar including (i) the invitation object displayed in the visual effects and (ii) an event object associated with an unselected calendar, wherein displaying the composite calendar further comprises:

displaying each of the invitation object and event object as a respective event block in the composite calendar.

10. The non-transitory computer-readable storage medium of claim 9, wherein the calendar field includes an identifier of a current calendar.

11. The non-transitory computer-readable storage medium of claim 9, wherein the visual effects comprise shading in a distinct shade or coloring in a distinct color.

12. The non-transitory computer-readable storage medium of claim 8, wherein each of the calendars in the list is scrollable, when displayed, in response to a touch input on a display screen of a mobile device.

13. The non-transitory computer-readable storage medium of claim 8, further comprising:

generating an invitation review interface for display, the invitation review interface including the invitation object and a graphic indicating that the invitation object is not accepted or rejected; and receiving an input selecting the invitation object through the invitation review interface.

14. The non-transitory storage medium of claim 13, further comprising:

generating a pop-up invitation object for display within an application window, the pop-up invitation object indicating the receipt of the invitation object.

15. A mobile device comprising:

a processor;

a storage device storing instructions that, when executed, are operable to cause the processor to perform operations comprising:

receiving an invitation object, the invitation object including an event notification;

in response to selecting the invitation object and before a view of a calendar is displayed, generating, by a processor, a calendar field, and displaying the calendar field via a user interface, wherein the user interface includes a list of a plurality of calendars displayed as a toggle selection, wherein each of the plurality of calendars are stored both on a mobile device and a remote server, and wherein each of the plurality of calendars is a daily calendar, weekly calendar, or monthly calendar, and labeled as a work calendar, a home calendar, or a birthday calendar;

receiving an input selecting multiple calendars from the plurality of calendars through the user interface;

associating, by a processor, the invitation object with the selected calendars; and displaying the invitation object using visual effects on the selected calendars.

16. The mobile device of claim 15, wherein the storage device further comprises the following steps:

displaying the invitation object in a composite calendar, the composite calendar including (i) the invitation object displayed in the visual effects and (ii) an event object associated with an unselected calendar, wherein displaying the composite calendar further comprises:

displaying each of the invitation object and event object as a respective event block in the composite calendar.

17. The mobile device of claim 16, wherein the calendar field includes an identifier of a current calendar.

18. The mobile device of claim 16, wherein the visual effects comprise shading in a distinct shade or coloring in a distinct color.

19. The mobile device of claim 15, wherein each of the calendars in the list is scrollable, when displayed, in response to a touch input on a display screen of the mobile device.

20. The mobile device of claim 15, wherein the storage device further comprises the following steps:

generating an invitation review interface for display, the invitation review interface including the invitation object and a graphic indicating that the invitation object is not accepted or rejected; and receiving an input selecting the invitation object through the invitation review interface.

21. The mobile device of claim 20, wherein the storage device further comprises the following steps:

generating a pop-up invitation object for display within an application window, the pop-up invitation object indicating the receipt of the invitation object.

* * * * *